(12) United States Patent
Bolignano et al.

(10) Patent No.: US 11,483,350 B2
(45) Date of Patent: Oct. 25, 2022

(54) INTENT-BASED GOVERNANCE SERVICE

(71) Applicant: Amazon Technologies, Inc., Seattle, WA (US)

(72) Inventors: Pauline Virginie Bolignano, London (GB); Tyler Bray, San Diego, CA (US); John Byron Cook, Brooklyn, NY (US); Andrew Jude Gacek, Maple Grove, MN (US); Kasper Søe Luckow, Sunnyvale, CA (US); Andrea Nedic, New York, NY (US); Neha Rungta, San Jose, CA (US); Cole Schlesinger, San Francisco, CA (US); Carsten Varming, Brooklyn, NY (US)

(73) Assignee: Amazon Technologies, Inc., Seattle, WA (US)

( * ) Notice: Subject to any disclaimer, the term of this patent is extended or adjusted under 35 U.S.C. 154(b) by 850 days.

(21) Appl. No.: 16/369,215

(22) Filed: Mar. 29, 2019

(65) Prior Publication Data
US 2020/0314145 A1 Oct. 1, 2020

(51) Int. Cl.
*H04L 9/40* (2022.01)
*G06F 8/41* (2018.01)
*G06F 9/54* (2006.01)

(52) U.S. Cl.
CPC .............. *H04L 63/20* (2013.01); *G06F 8/433* (2013.01); *G06F 9/54* (2013.01)

(58) Field of Classification Search
None
See application file for complete search history.

(56) References Cited

U.S. PATENT DOCUMENTS

| | | | | |
|---|---|---|---|---|
| 11,347,527 | B1 * | 5/2022 | Brossard | G06F 9/5055 |
| 2006/0143685 | A1 * | 6/2006 | Vasishth | G06F 21/62 |
| | | | | 726/1 |
| 2017/0288940 | A1 | 10/2017 | Lagos et al. | |
| 2019/0238591 | A1 * | 8/2019 | Shaw | H04L 63/0876 |

FOREIGN PATENT DOCUMENTS

CA   2386788 A1   4/2001

OTHER PUBLICATIONS

International Search Report and Written Opinion, PCT App. No. PCT/US2020/025455, dated Jun. 18, 2020, 14 pages.
Sedaghat et al., "Unifying Cloud Management: Towards Overall Governance of Business Level Objectives", 11th IEEE/ ACM International Symposium on Cluster, Cloud and Grid Computing, 2011, pp. 591-597.

* cited by examiner

*Primary Examiner* — Cai Y Chen
(74) *Attorney, Agent, or Firm* — Nicholson De Vos Webster & Elliott LLP

(57) ABSTRACT

Techniques for intent-based governance are described. For example, in some instances a method of receiving an indication of a change involving of one or more of code, a policy, a network configuration, or a governance requirement rule impacting a resource in a provider network for an account that is to be analyzed using one or more governance requirement rules; determining one or more governance requirement rules to evaluate for compliance after the update; evaluating the determined one or more governance requirement rules for compliance using one or more reasoning engines according to one or more policies; and making a result of the evaluating available to a user provides such governance.

20 Claims, 22 Drawing Sheets

INTENT-BASED GOVERNANCE GUI 801

Rule Selection

🔍 *Search rules* —— 803

[ ENABLE ] —— 805

| | Name | Description | Enforcement Type | Default |
|---|---|---|---|---|
| ☐ | NoPublicAccess | No public access to private networks or resources | Preventative + Audit ▶ | Yes |
| ☒ | EncryptionAlert | All data resources are encrypted | Audit ▶ | No |
| ☐ | NoDataExfiltration | No data can leave my VPC | Preventative + Audit ▶ | No |

*FIG. 8*

INTENT-BASED GOVERNANCE GUI 901

Rule Status

🔍 Search resources — 903

| Name | Description | Enforcement Type | Status |
|---|---|---|---|
| NoPublicAccess | No public access to private networks or resources | Preventative + Audit | Violation |
| EncryptionAlert | All data resources are encrypted | Audit | Compliant |
| NoDataExfiltration | No data can leave my VPC | Preventative + Audit | Compliant |

*FIG. 9*

NoPublicAccess Status

INTENT-BASED GOVERNANCE GUI 1001

🔍 *Search resources* — 1003

| Name | Resource Type | Account | Status |
|---|---|---|---|
| FinancialReports | Database Bucket | 111122223333 | Violation |
| CustomerOrders | Message Queue | 111122223333 | Compliant |
| MarketAlerts | Message Topic | 444455556666 | Compliant |

*FIG. 10*

INTENT-BASED GOVERNANCE GUI 1301

```
47:  public static void upload(SecretKey aesKey, String name, byte[] bytes) throws Exception{
48:    Cipher cipher = Cipher.getInstance("AES/CBC/PCS5Padding");
49:    cipher.init(Cipher.ENCRYPT_MODE, aesKey);
50:    AmazonS3 s3 = AmazonS3ClientBuilder.defaultClient();
51:    Encoder b64 = Base64.getEncoder();
52:    Try {
53:      String ciphertext = b64.encodeToString(cipher.doFinal(bytes));
54:      s3.putObject("example-bucket", name, ciphertext);
55:    } catch (Exception e) {
56:      // try again
57:      String ciphertext = b64.encodeToString(bytes);
58:      s3.putObject("example-bucket", name, ciphertext);
```
— 1303

DETAILS
Variable ciphertext on line 57 may not be encrypted
— 1305

*FIG. 13*

INTENT-BASED GOVERNANCE SERVICE

BACKGROUND

In modern provider-network environments (such as cloud computing environments), users manually evaluate their permissions and resources to audit and enforce organization-wide security governance guidelines. To answer questions about their data governance, users have to individually access all their accounts and resources, collect policies from several different services, and build custom tooling.

BRIEF DESCRIPTION OF DRAWINGS

Various embodiments in accordance with the present disclosure will be described with reference to the drawings, in which:

FIG. 8 illustrates embodiments of a graphical user interface for intent-based governance.

FIG. 9 illustrates embodiments of a graphical user interface for status of one more enabled rules for intent-based governance.

FIG. 10 illustrates embodiments of a graphical user interface for intent-based governance for a particular rule status.

FIG. 13 illustrates embodiments of a graphical user interface for intent-based governance for a violation of code.

DETAILED DESCRIPTION

Figure 1:
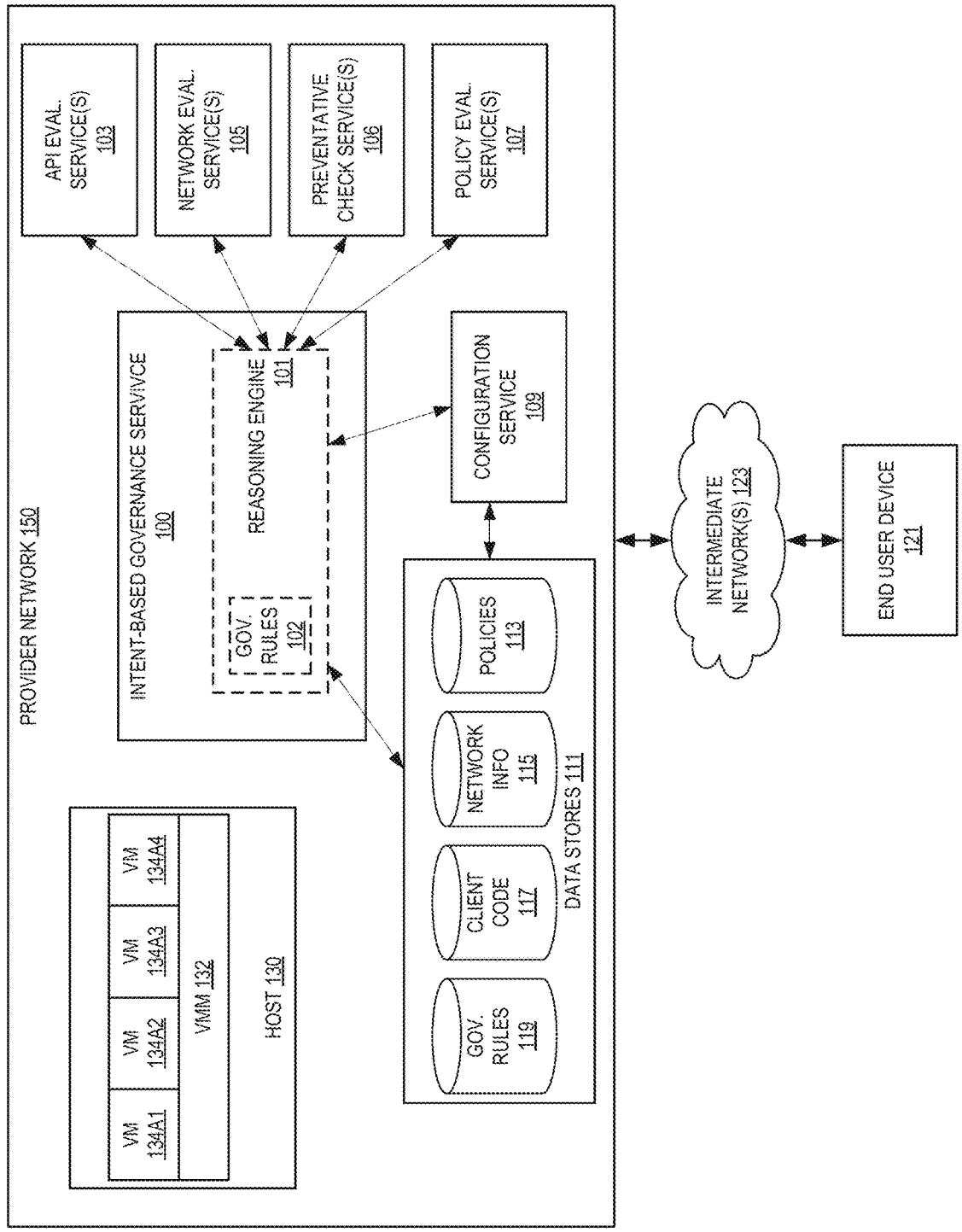
FIG. 1 illustrates embodiments of a system utilizing a provider network that includes an intent-based governance service.

Various embodiments of methods, apparatus, systems, and non-transitory computer-readable storage media for intent-based governance in a provider network are described.

The custom tooling discussed above relies on detecting patterns based on regular expressions and does not take into account the semantic meaning of policies. This led to users not being confident that they are achieving their data governance goals. The intent-based governance service detailed herein allows for automatic auditing and enforcement of access to critical resources across a user's cloud infrastructure with provable assurance. In particular, a user may configure intent-based governance requirement rules to audit data governance or use in a preventative manner to find "holes" in their code, network configuration, access privileges, etc. across multiple policies.

Governance requirements are an enterprise's procedures and systems that are relevant to the security, compliance, and business needs of its cloud infrastructure, applications, and code. The governance requirements also mandate how the provider network accounts and services are used, managed, and protected for that organization.

The intent-based governance service provides artifacts (reports) and other information (such as that a rule has been violated and how) demonstrating the efficacy of the security, compliance, and availability controls over the cloud resources (compute resources, data/storage resources, network-related resources, application resources, access policies or roles, identity policies or roles, machine images, routers and other data processing resources, etc.), configurations, and code. The intent-based governance service may use one or more automated reasoning engines to perform checks during many different phases such as code development, code deployment, network configuration (such as the infrastructure to be used) and generates evidence for compliance audits. In some instances, this allows for a user to evaluate adherence to security best practices provided by the provider network.

There are many examples of governance requirements. For example, many organizations' governance requirements mandate that certain accounts should not allow cross-account access, that only private internet protocol (IP) addresses should access databases tagged as private, and that code should not use deprecated application programming interfaces (APIs). Other questions users ask are "is data at rest always encrypted?" or "are there routes for possible data exfiltration?", etc.

In some embodiments, the intent-based governance service enables users to perform static analyses of code and infrastructure to achieve provable assurance of applications with respect to their governance requirements either during development or after deployments. When a desired invariant does not hold, the intent-based governance service generates a concrete test that can be executed on the application to demonstrate the scenario that causes the invariant to fail.

In some embodiments, there is a set of default governance requirements supported by the intent-based governance service relevant to their security, compliance, and business needs of an enterprise. Users of the intent-based governance service can deploy the default governance requirements, configure requirements based on their enterprise-specific scenarios, or opt-out of the governance requirements that are not applicable to their organization. Each governance requirement is mapped to a compliance (payment card industry (PCI)/Federal Risk and Authorization Management Program (FedRamp)), security (such as encrypt using 256-bit keys), and/or business requirement (such as no cross-account access to financial accounts).

FIG. 1 illustrates embodiments of a system utilizing a provider network that includes an intent-based governance service. The provider network 150 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 150 across one or more intermediate networks 123 (e.g., the internet) via one or more interface(s), such as through use of application programming interface (API) calls, via a console implemented as a website or application, etc. The interface(s) may be part of, or serve as a front-end to, a control plane of the provider network 150 that includes "backend" services supporting and enabling the services that may be more directly offered to customers via an end user device 121.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

As such, the provider network 150 allows for hardware virtualization technology that enables multiple operating systems to run concurrently on a host computer (e.g., host 130), i.e. as virtual machines (VMs) 134 on the host 130. The VMs 134 may, for example, be executed in slots on the hosts 130 that are rented or leased to customers of a network provider. A hypervisor, or virtual machine monitor (VMM) 132, on a host 130 presents the VMs 134 on the host with a virtual platform and monitors the execution of the VMs 134. Each VM 134 may be provided with one or more local IP addresses; the VMM 132 on a host 130 may be aware of the local IP addresses of the VMs 134 on the host.

As shown, the provider network 150 includes an intent-based governance service 100. As noted above, the intent-based governance service 100 helps evaluate resources, identities, and permissions across their organization.

The intent-based governance service evaluates, using one or more reasoning engines 101 according to one or more governance requirement rules which take into account permissions and desired security configurations specified in organizationally relevant policies 113 such as policies attached to roles and identities, service control policies (attached to organizations), resource policies (specific to provider network services), permission boundaries, scope policies, and virtual cloud network endpoint policies to provide debugging and auditing capabilities for client code 117 and networking configuration information 115 that are stored in one or more data stores 111. The data stores 111 may also store governance requirement rules 119 which may be pulled as need (or kept in memory 102 by) the intent-based governance service 100. The governance requirement rules are customizable. Users can specify values for principals, accounts, resource names, source IPs, source virtual networks, tags, CIDRs, and based on their data privacy, network control, and encryption requirements.

Examples such policy statements include, but are not limited to: 1) ensuring only a set of whitelisted principals can access something (e.g., have permissions to change infrastructure, e.g. can change security groups or add subnets; have permissions to create/update roles or identities; have permissions to make changes to both resource data and resource policies; etc.); 2) ensuring only users internal to an organization are permitted to: perform delete actions on database tables; perform read actions on key management keys; perform any action on database buckets (create, read, update, or delete (CRUD); etc.; 3) ensuring 256-bit keys or stronger are used; 4) ensuring keys are deleted after a set period of time; 5) ensuring that data is encrypted is tagged; 6) ensuring that sensitive plaintext only exists in memory and is not sent over the network; 7) ensuring that external key material is securely imported; 8) ensuring that envelope encryption is securely performed; 9) ensuring that compute instances that are tagged with a specific value are not reachable from the internet, are only reachable from specified CIDR blocks, and/or are unable to connect to instances as "public"; 10) etc.

In some embodiments, one or more reasoning engines 101 use mathematical analysis to understand what's happening in a complex computer system. In particular, the rules are formulated as a set of mathematical properties to be analyzed by one or more constraint solvers of the reasoning engine 101 to provide an answer of if the rule is being violated. In other embodiments, the intent-based governance service 100 calls one or more of the services 103-107 to analyze these properties and provide an answer back to the intent-based governance service 100. In some embodiments, multiple services 103-107 are utilized to answer a single question.

Note, while the intent-based governance service 100 is shown as being separate from the other services 103-109, in some embodiments, aspects of the intent-based governance service 100 are included in those services. In some embodiments, the intent-based governance service 100 includes one or more of other services 103-109.

In some embodiments, a configuration service 109 tracks changes to code 117, network configuration information 115, the governance requirement rules 119, and/or polices 113 and alerts the intent-based governance service 100 to evaluate the impact of the change based on one or more governance requirement rules.

The API evaluation service(s) 103 performs static analysis to ensure that the code meets the governance requirements of their enterprise. During the build process, the code, libraries, and build artifacts are analyzed based on the selected governance requirements rules. The code-based rules govern which APIs to use, what arguments to pass them, and what do with the results. Some examples of encryption-based requirements are: 1) an enterprise-specific requirement is to avoid using low-level cryptographic primitives when high-level constructs are available; 2) a FedRamp compliance requirement is to only use 256-bit keys; and 3) a general security best-practice is to destroy plaintext data keys after performing envelope encryption.

In some embodiments, one or more control flow graphs for the code are generated and all paths of these graphs are then symbolically evaluated to see if the there is a rule that is not followed for a given API call.

The network evaluation service(s) 105 evaluates network controls such as security groups, access control lists, peering connections, route tables, and more. It uses mathematics to evaluate all possible network paths to prove that applications are segmented as described by governance requirements. The network evaluation service(s) 105 performs a "network snapshot" of an account using API describe calls. The snapshot contains the list of network instances, subnets, and their route tables in a particular virtual network (or set of virtual networks). The network snapshot represents the network topology. This network topology can also be extracted from network templates. The network evaluation service(s) 105 then translates this snapshot into a formal description of first-order Horn clauses and use the theory of bit vectors to describe ports, IPv4 addresses, and subnet masks. The specification part of the network model contains types, predicates, constants, and rules that encodes the semantics of the networking components. This allows the engine to have an understanding of the semantics of instance networks. The network model along with the formalization of the semantics is queried through techniques for automated theorem proving to answer questions related to the governance requirements of an organization.

Figure 2:
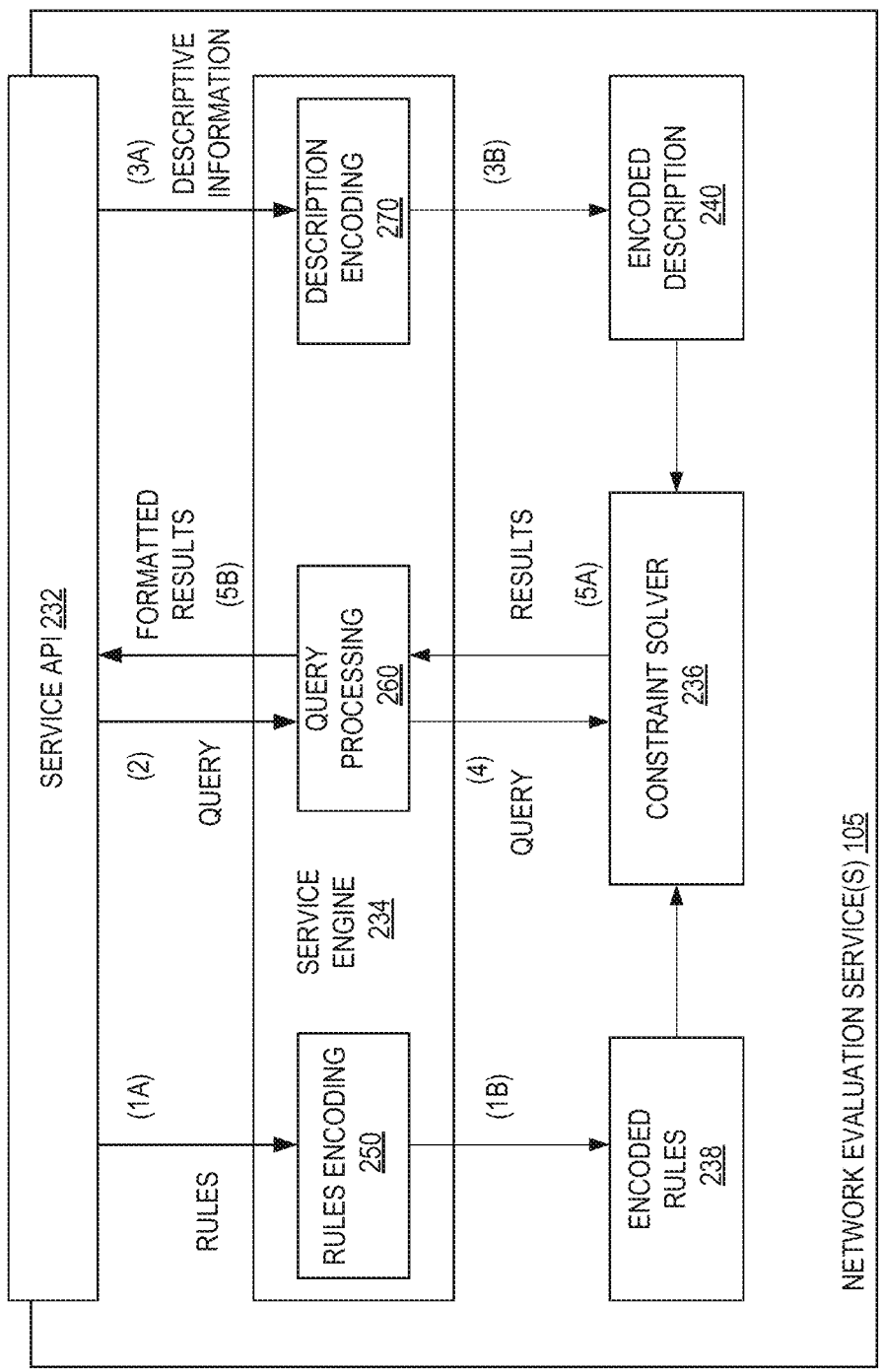
FIG. 2 illustrates components and operation of an example virtual network verification service, according to some embodiments.

FIG. 2 illustrates components and operation of an example virtual network verification service, according to some embodiments. The network evaluation service(s) 105 may be implemented by one or more computing devices on a provider network. In some embodiments, an instance of the network evaluation service(s) 105 may be implemented on the client's virtual network. As shown in FIG. 2, in some embodiments, the network evaluation service(s) 105 may include a service engine 234, a constraint solver 236 engine, and an API 232. Service engine 234 may implement, but is not limited to, rules encoding 250 logic, query processing 260 logic, and description encoding 270 logic. Constraint solver 236 is a declarative logic programming language engine configured to resolve queries, including recursive queries, about the virtual network as represented by the encoded description 240 based on encoded virtual networking rules 238. API 232 exposes functionality of the service 210 to external entities including but not limited to the client.

At (1A) and (1B) of FIG. 2, rules encoding 250 logic of the service 105 may obtain (1A) and encode (1B) virtual networking rules 238 to be applied to the virtual network. Rules to be encoded may be obtained from the service provider, from the client, or from other external entities or sources. Example encoded rules 238 are provided later in this document.

In embodiments, virtual networking semantics and logic for the networking primitives used in virtual networks may be obtained and encoded as a set of virtual networking rules 238 according to the logic programming language. The virtual networking rules 238 may include rules that express common relationships and interactions among the various networking primitives that may be implemented in virtual networks and that are provided by the provider networks services and APIs. Thus, embodiments may provide, in one location or file, virtual networking rules 238 that describe the logic of how virtual networking works in the provider network environment.

In some embodiments, the network evaluation service(s) 105 may obtain and encode rules for networking security standards such as the Payment Card Industry Data Security Standard (PCI DSS), the Federal Risk and Authorization Management Program (FedRAMP) standard, or the Health Insurance Portability and Accountability Act (HIPPA) standard, and thus sets of virtual networking rules 238 may be implemented that include rules for verifying networking security standards. In some embodiments, the virtual network verification service 105 may provide two or more different sets of virtual networking rules 238 that each encode different networking security standards that may be selectively used by clients to verify that their virtual networks conform to particular standards. In some embodiments, the virtual network verification service 105 may allow a client to define custom rules that encode the client's internal security standards, best practices, or other networking requirements, and thus sets of virtual networking rules 238 may be implemented that include custom rules defined by the clients for application to their particular virtual network.

At (2) of FIG. 2, query processing 260 logic of the service 105 may receive a query from the client to be resolved for the virtual network according to the virtual networking rules 238. In some embodiments, the client may provide the query about their virtual network on the provider network via a graphical interface or a command line interface (CLI) to the service API 232. In some embodiments, the query may be posed in an expressive language that is similar to SQL, but that applies to network configurations. Alternatively, in some embodiments, the queries may be posed in human-friendly ways.

At (3A) and (3B) of FIG. 2, description encoding 270 logic of the service 105 may obtain (3A) and encode (3B) a description of the virtual network. In some embodiments, description encoding 270 logic of the network evaluation service(s) 105 obtains descriptive information (3A) for the virtual network and encodes (3B) the descriptive information as an encoded description 240 for each query it receives to insure that the description 240 is up-to-date when resolving the query. However, in some embodiments, description encoding 270 logic may obtain and encode descriptive information for the virtual network, and method two or more queries using the encoded description 240. At (3A) of FIG. 2, description encoding 270 logic of the network evaluation service(s) 105 obtains descriptive information for the client's virtual network. The descriptive information may, for example, identify instances of the networking primitives that are implemented in the virtual network, include descriptions of the various instances (e.g., roles assigned to instances, permissions granted or denied to instances, IP addresses assigned to the instances, etc.), describe relationships among the instances (e.g., paths between instances), and describe interfaces or access points to external entities. In some embodiments, the client may obtain the descriptive information from the virtual network and provide the descriptive information to the network evaluation service(s) 105 with the query. Alternatively, in some embodiments, the client may grant permission to the network evaluation service(s) 105 to allow the virtual network verification service 105 to obtain the descriptive information directly from the virtual network in response to the query. At (3B) of FIG. 2, description encoding 270 logic of the service 105 may encode the obtained descriptive information as logic programs according to the declarative logic programming language.

At (4) of FIG. 2, query processing 260 logic of the network evaluation service(s) 105 may provide the query to the constraint solver 236. The constraint solver 236 resolves the constraint problem expressed by the query for the encoded description 240 according to the encoded rules 238, and at (5A) provides results (e.g., answers to the question posed by the query) to query processing 260 which formats the results and provides the formatted results to the client via the API 232 at (5B). The formatted results may include textual results (e.g., text that expresses an answer to a constraint posed by the query such as "YES", "NO", "TRUE", or "FALSE", a list of instances that meet a constraint posed by the query, etc.) and/or graphical results (e.g., a graphical representation of a relationship among two or more instances that was determined by resolving the query, a graphical representation of the virtual network identifying instances that were identified by resolving the query, etc.).

Figure 3:
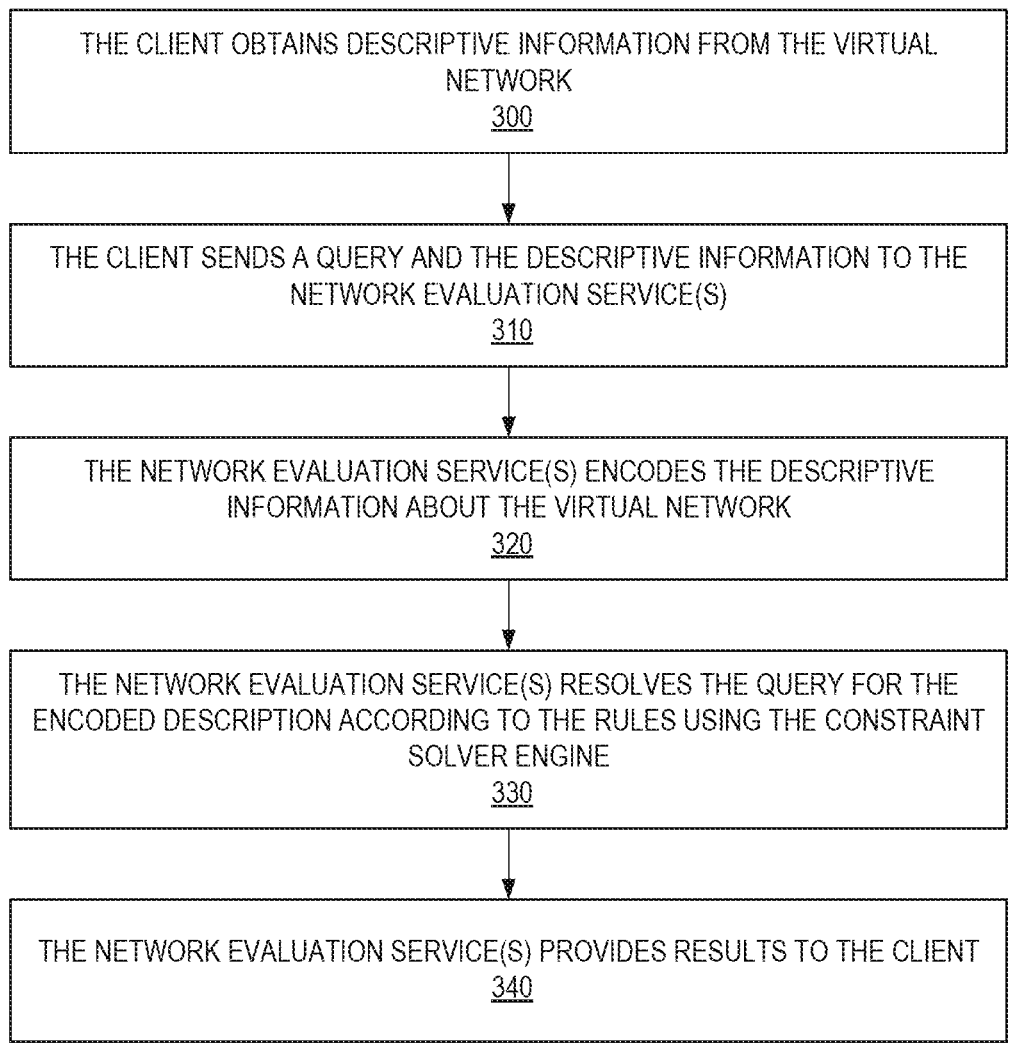
FIG. 3 is a flowchart of a method for providing information about a virtual network to clients of a provider network in which the client provides descriptive information and queries to a virtual network verification service, according to some embodiments.

FIG. 3 is a flowchart of a method for providing information about a virtual network to clients of a provider network in which the client provides descriptive information and queries to a virtual network verification service, according to some embodiments. As indicated at 300, the client obtains descriptive information from the virtual network, for example using DESCRIBE calls provided by provider network service APIs. As indicated at 310, the client sends a query and the descriptive information to the virtual network verification service. As indicated at 320, the verification service encodes the descriptive information about the virtual network. As indicated at 330, the verification service resolves the query for the encoded description according to the encoded virtual network rules using the constraint solver engine. As indicated at 340, the virtual network verification service provides results of the query resolution to the client.

The preventative check service(s) 106 uses hooks to prevent provisioning or updating resources that are not compliant with the governance requirements. These hooks provide the ability evaluate the governance requirements (e.g., ensure only instances tagged bastion can be accessed through the internal before the CRUD operations. In some embodiments, if the assets being deployed do not conform to governance requirements, it is not provisioned or updated and the entire stack is rolled back. Information is provided to the customer about which resources and configurations violated the specified governance requirements. It even provides information about why governance requirements are not met.

Figure 4:
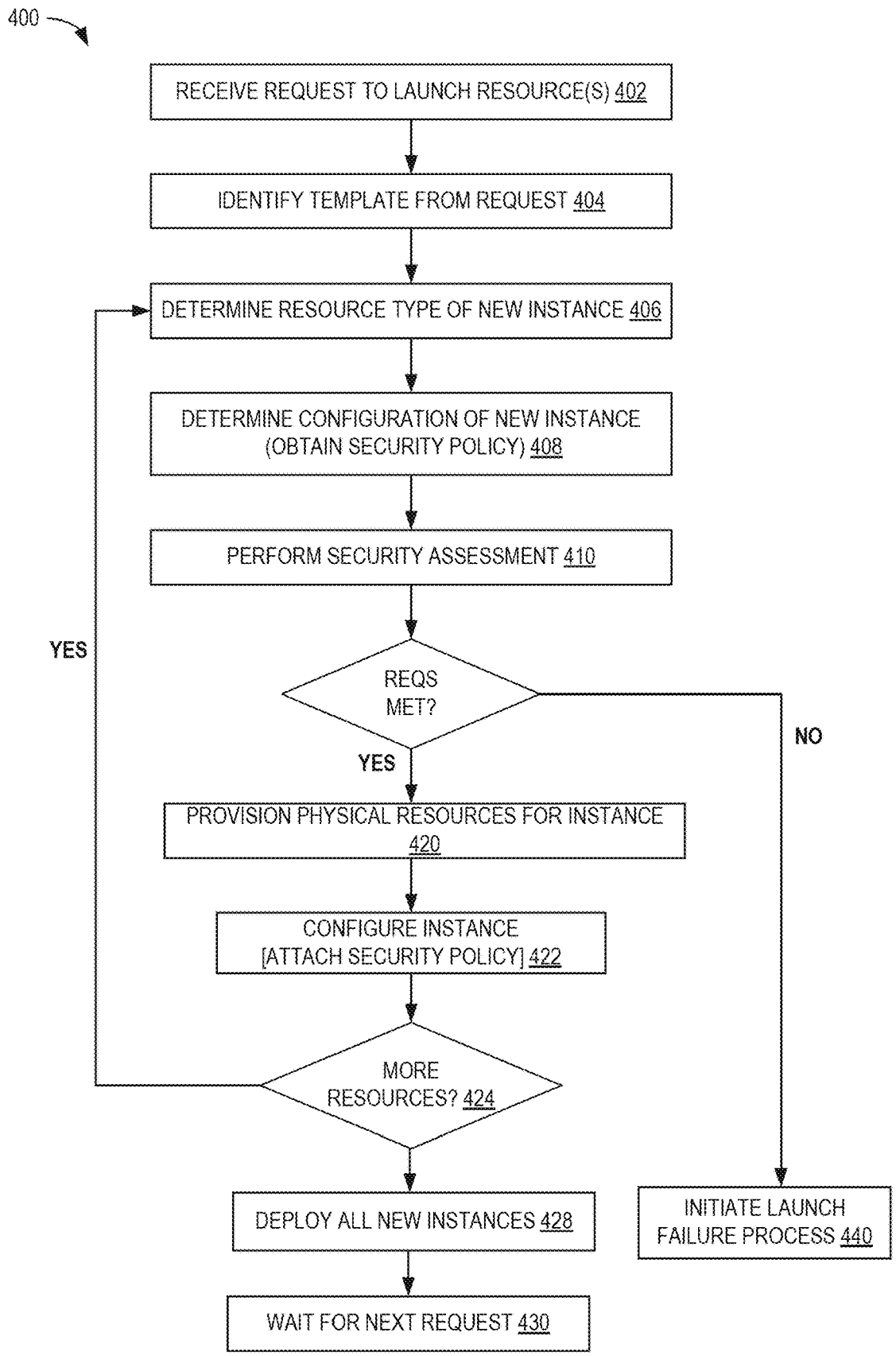
FIG. 4 illustrates an example method to validate requested virtual resources and their configurations against a predetermined set of security checks, as described above.

FIG. 4 illustrates an example method to validate requested virtual resources and their configurations against a predetermined set of security checks, as described above. At 402, the preventative check service(s) 106 may receive a request to launch and/or access virtual computing resources. For example, the preventative check service(s) 106 may receive launch commands from the user associated with the virtual resources, such as via an administrator API, or the preventative check service(s) 106 may receive a request from an end user connected to the preventative check service(s) 106 via an end user API, or another event occurring in the preventative check service(s) 106 may trigger the request. The request may include information that allows the preventative check service(s) 106 to, at 404, identify a template containing definitions for the requested resources. For example, the request may include a stack identifier that the preventative check service(s) 106 may use to access a template database and obtain the template associated with the stack identifier.

At 406, the preventative check service(s) 106 may select a first computing resource definition from the template and determine the associated resource type, which may be one of the fields of the resource definition. At 408, the preventative check service(s) 106 may determine and/or create a configuration for a new virtual resource instance, based at least in part on the properties identified in the computing resource definition. Additionally, the preventative check service(s) 106 may obtain and/or create a security policy to be attached to the virtual resource instance. For example, the preventative check service(s) 106 may use the resource name of the computing resource definition to identify a security policy referencing the resource name In another example, the preventative check service(s) 106 may use the resource type to identify the security policy. In yet another example, the security policy, or a reference thereto, may be included in the computing resource definition.

At 410, the preventative check service(s) 106 may perform the security assessment, which identifies any parameter or other aspect of the proposed configuration and security policy of the virtual resource instance that violates a predetermined security requirement. If all of the security requirements are met (e.g., security checks are passed), the preventative check service(s) 106 can continue the deployment method by proceeding to 420. If not all security requirements are met, at 440 the preventative check service(s) 106 may initiate a failure method in which the virtual resource(s) of the request is/are denied deployment.

In some embodiments, to perform the security assessment (410) the preventative check service(s) 106 may evaluate one or more comparisons of configuration parameters derived from the template and/or the request (as determined at 408) to aspects of the security model described above. Nonlimited examples of parameters that may be tested include: properties having default values set by the computing resource definition in the template; properties defined in the template and having variable values that are determined from data in the request, one or more user accounts, historical usage data stores, other virtual resource instances presently executing in the associated virtual computing environment, data sources external to the preventative check service(s) 106, and/or other data stores; parameters of the user account of a requesting end user; and, parameters of the security policy. Additionally, or alternatively, the preventative check service(s) 106 may evaluate data collected by performing static or dynamic analysis of various stored data and/or telemetry data generated by executing virtual resource instances. The reference values against which the collected configuration parameters and other data are compared may be specified by security checks included in the template and/or the request; these reference values may be stored in the security model and/or the model security policies described above. Various examples of the security checks, the data evaluated by the checks, and the methods in which the data are evaluated are described throughout the disclosure.

At 420, after determining that the proposed configuration and security policy are valid, the preventative check service(s) 106 may provision physical and/or virtual computing resources and create the virtual resource instance therein. For example, to provision a virtual machine instance, the preventative check service(s) 106 may identify one or more hardware computing devices having sufficient available processing, memory, and data storage resources. The preventative check service(s) 106 may allocate these physical resources by creating logical partitions and installing a virtual machine image, or an operating preventative check service(s) 106, a file preventative check service(s) 106, device drivers, and software applications, in the appropriate partitions. At 422, the preventative check service(s) 106 may configure the provisioned instance using the proposed configuration determined/created at 408. This may include attaching the security policy to the virtual resource instance, such that access to the virtual resource instance is controlled by the security policy permission statements. At 424, the preventative check service(s) 106 may determine whether any more virtual resource instances must be created from the template/request. If so, the preventative check service(s) 106 returns to 406; if not, the preventative check service(s) 106 may deploy all newly provisioned instances (428) into the execution environment associated with the client user, and then wait for the next request (430).

The policy evaluation service(s) 107 utilizes automated reasoning to analyze policies 113 and consequences of them. These policies dictate who can or cannot do what to which resources. Data privacy related governance requirements are designed around identity and access management and the evaluation of access control policies. The policy evaluation service(s) 107 knows about semantics of identity and access management and resource-based policies.

The policy evaluation service(s) 107 translates policies to the language of Satisfiability Modulo Theories (SMT), then encodes queries as logical assertions, and passes the resulting problems to a family of SMT solvers. The policy evaluation service(s) 107 solvers determine if any requests satisfy the given query, or proves that no such requests exist. The policy evaluation service(s) 107 explores different combinations of constraints to generate the result and passes back the results as a JSON response. The policy evaluation service(s) 107 all of the policies that are relevant such as permission boundaries, policies attached to identity and access management roles and users, scope policies, and resources policies are evaluated to determine compliance. The engine also considers the impact of role chaining. Role chaining occurs when you use an identity and access management role to assume another role. If a user has permission to assume Role A that grants permission to assume Role B, then the user can be granted the permissions of Role B.

In some embodiments, a security policy may include one or more permission statements as well as additional information such as versioning information and policy-wide information. A security policy may include a set of conditions that can be utilized to determine whether to grant access or deny access to computing resources in various contexts, such as in the context of different users, different actions being performed on the computing resources, and different conditions of access. An authorization module or authorization service, such as those described elsewhere in this disclosure, may be utilized to evaluate whether to grant or deny a request to access resources based at least in part on evaluating a security policy in connection with the request. In some cases, policy-wide information is included in a policy header at the beginning of a policy or may even be stored separately from (and in association with) a policy document. A policy may include multiple policy statements.

As described throughout this disclosure, a policy evaluation service(s) 107 may be a service of a computing resource service provider and may support one or more APIs that a client may utilize to submit requests to the policy evaluation service(s) 107 to evaluate security policies, such as an API to determine whether a first security policy is more permissive than a second security policy and whether two or more security policies are equivalent. In this context, permissiveness is used to describe access to resources. For example, if a first policy can be utilized to access to a first computing resource (e.g., resource "A") and a second resource (e.g., resource "B") and a second policy grants access only to computing resource "B," then the first policy may be described as being more permissive than the second policy because there exists a computing resource which the first policy grants access to which the second policy does not grant access to and there does not exist a resource that the second policy grants access to which the first policy does not grant access to. Two policies may be equivalent if they both can be utilized to access to the same resources and deny (either implicitly or explicitly) access to the same resources. Generally, speaking, if two policies are not equivalent, they may be said to lack equivalency. In some cases, if a first policy grants access to a first computing resource "A" and a second computing resource "B" and a second policy grants access to the second computing resource "B" and a third computing resource "C" the polices may be said to be incomparable.

An API call supported by the policy evaluation service(s) 107 may accept two security policies and determine whether they are equivalent, whether one policy is more permissive than the other policy, whether the policies are incomparable, and so on. As a second example, an API call may accept two or more security policies and determine whether all of the security policies provided as part of the API request are equivalent. As a third example, an API call may accept a single security policy and compare the security policy against one or more best practices policies. The best practices policies may be a set of security policies that are determined to be a set of permissions which are should not be allowed. For example, a first best practices policy may be that a particular data container should not be world-writeable (e.g., any principal, even a guest user or anonymous user can write to the container). The API may verify that best practices policies are being followed by determining that the received policy is not more permissive than each of the best practices policies. Examples of best practices policies may include resources being world writeable, world readable, world accessible, and the like. In some embodiments, a collection of best practices policies may be determined based on the API call, the type of computing resource requested, and other context information.

The policy evaluation service(s) 107 may include multiple components and/or modules such as a policy parser; a propositional logic translator; and a satisfiability engine. The policy parser may be a component or module that receives a security policy and obtains one or more permission statements from the policy. For example, if the client provides a first policy "A" and a second policy "B," the policy parser may obtain a first set of permission statements from policy "A" and a second set of permission statements from policy "B." The permission statements may each be associated with the granting or denying access to computing resource. A propositional logic translator may convert permission statements into one or more constraints described using propositional logic. The constraints may be described in various formats and in accordance with various standards such as SMT-LIB standard formats, CVC language, and Center for Discrete Mathematics and Theoretical Computer Science (DIMACS) formats. The propositional logic expressions generated by the propositional logic translator may represent a set of constraints that must be satisfied for the corresponding permission statement to be in effect.

A satisfiability engine may be used to compare the first propositional logic expression and the second propositional logic expression to determine whether one propositional logic is more permissive than the other. A satisfiability engine may be used to analyze the permissiveness of two or more propositional logic expressions. The satisfiability engine may generate additional propositional logic constraints as part of determining whether the first propositional logic expression is more permissive than the second propositional logic expression. The constraints may be generated and evaluated in addition to constraints of the first propositional logic expression and the second propositional logic expression. The constraints may be generated based at least in part on what a client requests. For example, the satisfiability engine may generate constraints that are satisfied only under circumstances where a first policy grants access to a resource and a second policy denies access to the resource or is neutral regarding the resource in response to a request from a caller to determine whether a first propositional logic expression is more permissive than a second propositional logic expression. The satisfiability engine may be used to verify whether the propositional logic constraints (e.g., those obtained from the first and second propositional logic expressions and those generated by the satisfiability engine. In some embodiments, a command may be used to determine whether the set of constraints are satisfiable. A formula may be satisfiable if there is an interpretation that makes all the asserted formulas true. In other words, the model is satisfiable if each of the constraints is satisfied under some conditions. In some embodiments, the satisfiability engine may be implemented at least in part using a SMT solver such as Z3, as described in https://github.com/Z3Prover/z3.

Figure 5:
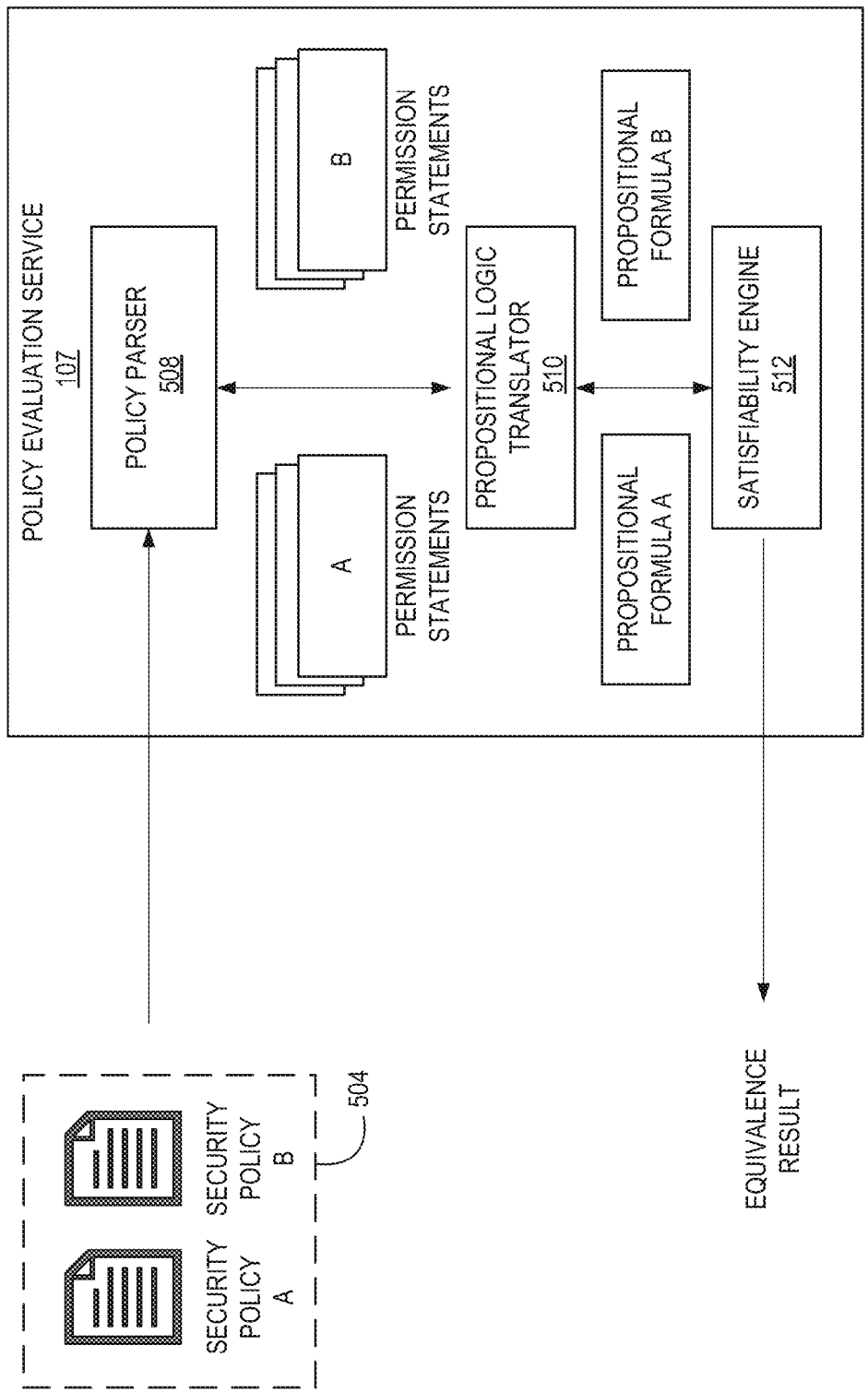
FIG. 5 is an illustrative example of policy evaluation service.

FIG. 5 illustrates embodiments of a policy evaluation service. In particular, this illustrates an example in which a client (such as the intent-based governance service 100) may request a policy analyzer service 504 to analyze security policies 504 to determine the relative permissiveness of the policies—in other words, the policy analyzer may be used to determine whether the security policies 504 are equivalent, whether a first security policy (e.g., Security Policy A shown in FIG. 5) is more permissive than a second security policy (e.g., Security Policy B shown in FIG. 5), and more.

The policy analyzer service 107 can determine the equivalency of two or more security policies 504. A request to this service may come in the form of an API request to the policy analyzer service that includes two or more security policies 504. A security policy may be information (e.g., encoded in a file) that specifies one or more security permissions. Security permissions may be elements of the security policy that define access rights associated with resources and/or principals of a system. For example, a permission may be used to grant or deny access to computing resources of a computing resource service provider. Policies may be expressed in a language independent format such as JavaScript Object Notation (JSON). Examples discussed in this disclosure may be in JSON format or in a format similar to JSON and as illustrations of various embodiments which may be implemented. Of course, various other formats which may be utilized in the manner described in connection with JSON and JSON-like formats are also contemplated and within the scope of this disclosure. A security policy may include one or more permission statements as well as additional information such as versioning information and policy-wide information. In some cases, policy-wide information is included in a policy header at the beginning of a policy or may even be stored separately from (and in association with) a policy document. A policy may include multiple policy statements.

The policy analyzer service 107 may be a service of a computing resource service provider (e.g., a computing resource service provider described elsewhere in connection with FIG. 4). The policy analyzer service 107 may be implemented using hardware, software, and a combination thereof. In some cases, the policy analyzer service 107 supports one or more APIs that a requestor may use to provide requests to the policy analyzer service 107. The policy analyzer service 107 may support one or more APIs that are used to evaluate security policies (e.g., the security policies 504 described in connection with FIG. 5), such as an API to determine whether a first security policy is more permissive than a second security policy and whether two or more security policies are equivalent.

In some embodiments, permissiveness is used to describe the grant of access to resources. For example, if a first policy grants access to a first computing resource (e.g., resource "A") and a second resource (e.g., resource "B") and a second policy grants access only to computing resource "B," then the first policy may be described as being more permissive than the second policy because there exists a computing resource which the first policy grants access to which the second policy does not grant access to and there does not exist a resource that the second policy grants access to which the first policy does not grant access to. Two policies may be equivalent if they both grant access to the same resources and deny (either implicitly or explicitly) access to the same resources. In some cases, equivalency may refer to two policies explicitly granting access to the same resources and explicitly denying access to the same resources—in other words, if a first policy explicitly denies access to a computing resource and a second policy implicitly denies access to a computing resource (e.g., by not affirmatively granting access in a deny-by-default context) may lack equivalency in some embodiments. Generally, speaking, if two policies are not equivalent, they may be said to lack equivalency. In some cases, if a first policy grants access to a first computing resource "A" and a second computing resource "B" and a second policy grants access to the second computing resource "B" and a third computing resource "C" the polices may be said to be incomparable. It should be noted that unless otherwise specified, examples described herein may implement a deny-by-default security model in which access to a computing resource is denied unless there exists an explicit grant of access to the computing resource. It should furthermore be noted that in the context of these discussions, security policies may be utilized to grant or deny access to resources in the context of a computing resource service provider where a request to access resources may be evaluated by an authorization module or authorization service by utilizing a security policy applicable to the request. An applicable security policy may be a security policy associated with the requestor, a security policy associated with a token that the requestor presents, and more. Such techniques may be performed in accordance with a computing resource service provider described elsewhere in connection with FIG. 4.

The policy analyzer service 107 may be used to determine the permissiveness of one or more policies. For example, an API call supported by the policy analyzer service 107 may accept two security policies and determine whether they are equivalent, whether one policy is more permissive than the other policy, whether the policies are incomparable, and so on. As a second example, an API call may accept two or more security policies and determine whether all of the security policies provided as part of the API request are equivalent. As a third example, an API call may accept a single security policy and compare the security policy against one or more best practices policies. The best practices policies may be a set of security policies that are determined to be a set of permissions which are should not be allowed. For example, a first best practices policy may be that a particular data container should not be world-writeable (e.g., any principal, even a guest user or anonymous user can write to the container). The API may verify that best practices policies are being followed by determining that the received policy is not more permissive than each of the best practices policies. Examples of best practices policies may include resources being world writeable, world readable, world accessible, and the like. In some embodiments, a collection of best practices policies may be determined based on the API call, the type of computing resource requested, and other context information.

A policy analyzer service 107 may include multiple components and/or modules such as a policy parser 508; a propositional logic translator 510; and a satisfiability engine 512. In some embodiments, the functions of various components and/or modules may be delegated to other services with which the policy analyzer service 107 may utilize. For example, the policy analyzer service 107 may, in some embodiments, utilize a different service for performing functionality related to parsing policies.

The policy parser 508 may be a component or module that receives a security policy (e.g., a security policy received from a client in connection with an API call or obtained via a policy management service) and obtains one or more permission statements from the policy. For example, if the client provides a first policy "A" and a second policy "B" to the policy analyzer service 504, the policy analyzer service 504 may use the policy parser 508 to obtain a first set of permission statement from policy "A" and a second set of permission statement from policy "B." The permission statements may each be associated with the granting or denying access to computing resource. The permission statements may be in a particular format such as JSON, Aspen, and more.

As described herein, propositional logic may refer to a symbolic logic that relates to the evaluation of propositions that may evaluate to either being true or false. Propositional logic may be utilized to evaluate the logical equivalence of propositional formulas. A propositional formula may be a statement in accordance with a syntax that includes propositional variables and logical connectives that connect the propositional variables. Examples of logical connectives or logical operators may include: "AND" (conjunction), "OR" (disjunction), "NOT" (negation), and "IF AND ONLY IF" (biconditional) connectives. Propositional logic may also be described herein as a "propositional expression" or a "propositional logic expression." In some embodiments, first-order logic may be utilized in place of propositional logic. First-order logic may refer to a formal system that utilizes quantifiers in addition to propositional logic. Examples of quantifiers include "FOR ALL" (universal quantifier) and "THERE EXISTS" (existential quantifier). Unless explicitly noted, embodiments of this disclosure described in connection with propositional logic may also be implemented using first-order logic—for example, in some embodiments, a first-order logic translator (not shown in FIG. 5) may be utilized in place of a propositional logic translator 510 to translate permission statements to first-order logic expressions and a satisfiability engine may evaluate one or more first-order logic expressions to determine whether the expressions are equivalent.

Permission statements (e.g., those obtained by the policy parser 508) may be provided to a propositional logic translator 510. A propositional logic translator 510 may receive a permission statement (e.g., in JSON format) and convert the permission statement into one or more constraints described using propositional logic. The constraints may be described in various formats and in accordance with various standards such as SMT-LIB standard formats, CVC language, and Center for Mathematics and Theoretical Computer Science (DIMACS) formats.

For example, a permission statement (e.g., a permission statement included as part of a security policy) may be described as:

```
"Statement": [
{
"Effect": "Allow",
"Resource": *,
"Principal": *,
"Action": "put*"
} ]
```

The corresponding propositional logic constraints may be generated from the example policy statement may be described as:

The propositional logic expressions generated by the propositional logic translator 510 may represent a set of constraints that must be satisfied for the corresponding permission statement to be in effect. The constraints described above correspond to a set of constraints that are necessarily satisfied if the preceding permission statement allowing access to APIs starting with "put" (e.g., "put-object") to be fulfilled.

In some embodiments, a web API request to the policy analyzer service 107 is the request that the policy analyzer service 107 determine whether a first security policy (e.g., "Security Policy A" illustrated in FIG. 5) is more permissive than the second security policy (e.g., "Security Policy B"). The security policies 504 may be encoded in the web API request or information usable to obtain the security policies (e.g., a pointer or a URI indicating the location where a policy may be obtained) may be provided. The policy analyzer service 107 may obtain the security policies 504 (e.g., either directly from the request or via a policy management service using a URI encoded in the request) and utilize a policy parser 508 to obtain a first set of permission statements from the first policy and a second set of permission statement from the second policy. The policy statements may be provided to a propositional logic translator 510 to obtain a set of propositional logic expressions that correspond to constraints that must be satisfied for the corresponding policy statement to be in effect. A first propositional logic expression may be generated from the first set of policy statements and a second propositional logic expression may be generated from the second set of policy statements. The propositional logic expressions may be expressed in a language in accordance with a SMT-LIB standard language such as the STM-LIB 2.0 standard. A satisfiability engine 512 may be used to compare the first propositional logic expression and the second propositional logic expression to determine whether one propositional logic is more permissive than the other.

A satisfiability engine 512 may be used to analyze the permissiveness of two or more propositional logic expressions. The satisfiability engine 512 may be hardware, software, or a combination thereof. In some embodiments, the satisfiability engine 512 allows clients (e.g., internal clients such as the propositional logic translator 510, the policy analyzer service 107, etc.) to determine whether a first propositional logic expression is more permissive than a second propositional logic expression. The satisfiability engine 512 may generate additional propositional logic constraints as part of determining whether the first propositional logic expression is more permissive than the second propositional logic expression.

In some embodiments, the satisfiability engine 512 utilizes the following constraints to determine whether a first policy (e.g., policy A) is more permissive than a second policy (e.g., policy B):

(assert (or policyB.neutral policyB.denies))
(assert policyA.allows)

The constraints may be generated and evaluated in addition to constraints of the first propositional logic expression and the second propositional logic expression, which may be encoded in the manner described above in connection with the discussions of FIG. 5. The constraints may be generated based at least in part on what a client requests. For example, the satisfiability engine 512 may generate constraints that are satisfied only under circumstances where a first policy grants access to a resource and a second policy denies access to the resource or is neutral regarding the resource in response to a request from a caller (e.g., the policy analyzer service 107) to determine whether a first propositional logic expression is more permissive than a second propositional logic expression. Such an embodiment may be implemented in a deny-by-default context where a neutral context (i.e., a context where no permission explicitly grants or denies access to a particular resource). In an allow-by-default context, the satisfiability engine 512 may generate different constraints that are satisfied where the first policy grants access to a resource or is neutral regarding the resource and the second policy does not deny access to the resource.

The satisfiability engine 512 may be used to verify whether the propositional logic constraints (e.g., those obtained from the first and second propositional logic expressions and those generated by the satisfiability engine) are equivalent. In some embodiments, a command may be used to determine whether the set of constraints are satisfiable. A formula may be satisfiable if there is an interpretation that makes all the asserted formulas true. In other words, the model is satisfiable if each of the constraints is satisfied under some conditions. In some embodiments, the satisfiability engine may be implemented at least in part using a satisfiability modulo theories (SMT) constraint solver to determine whether a formula is satisfiable. An example of a SMT-based constraint solver is Z3. Other types of solvers may be utilized in accordance with the techniques described herein as part of implementing a satisfiability engine including but not limited to satisfiability (SAT) solvers and binary decision diagrams (BDD) solvers. The satisfiability engine 512 may generate an equivalence result that indicates whether the formula is satisfiable and, by extension, whether two or more policies are equivalent.

Figure 6:
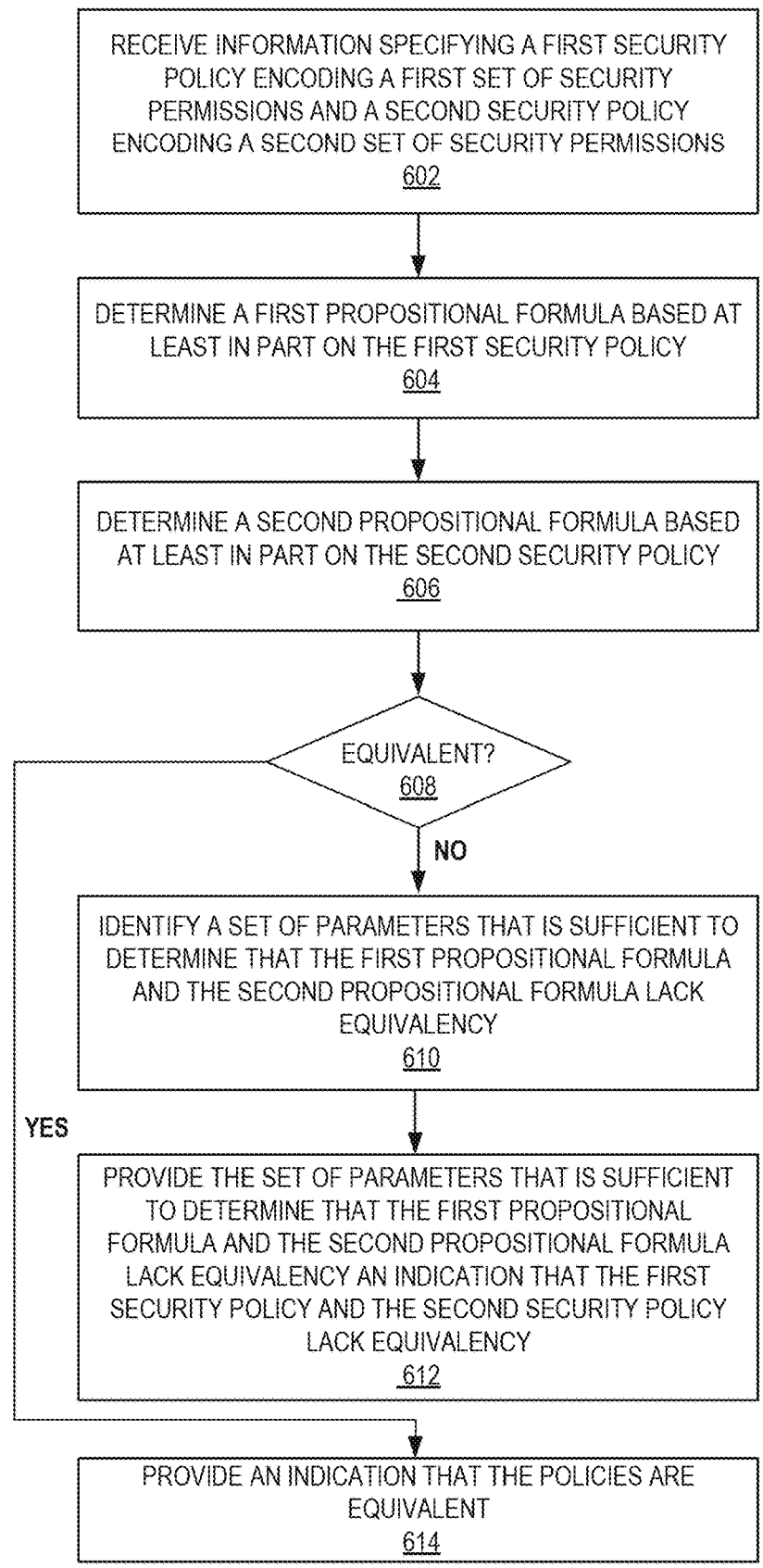
FIG. 6 shows an illustrative example of a method for determining the equivalency of two or more security policies according to some embodiments.

FIG. 6 shows an illustrative example of a method for determining the equivalency of two or more security policies according to some embodiments. Generally, the method may be performed by any suitable system such as a policy analyzer service described elsewhere in this disclosure, such as those described in connection with FIG. 1. The method may be implemented using hardware, software, or a combination thereof. In an embodiment, the method includes receiving 602 information specifying a first security policy and a second security policy. In some embodiments, the policy analyzer service receives the information as part of an interface, such as a web API request. In some embodiments, the security policies respectively encode a set of security permissions, which may be expressed in a language independent format such as JSON. The security permissions may be in accordance with those discussed elsewhere. In some embodiments, the information specifying either or both policies may be specified directly (e.g., encoded as part of a data payload of a request) or indirectly (e.g., a reference to a policy is received by the policy analyzer service such that the reference may be used to obtain the policy, such as from a policy management service).

The policy analyzer service may determine 604 a first propositional logic expression based at least in part on the first security policy. The determination may furthermore be made based on the first set of security permissions that is associated with the first security policy. The determination may be made in accordance with various embodiments described elsewhere in this disclosure. For example, the policy analyzer service may use a parser to obtain the first set of security permissions from the first security policy using a parse and may translate the first set of security permissions to a set of constraints in propositional logic. In some embodiments, the policy analyzer service translates a security policy expressed in JSON to a propositional logic expression (e.g., including one or more constraints) described in accordance with a SMT-LIB standard such as the SMT-LIB 2.0 standard.

The policy analyzer service may determine 606 a second propositional logic expression in the same or substantially similar manner as described above in connection with determining 604 the first propositional logic expression. However, in some embodiments, the steps may differ. For example, in some cases, the policy analyzer service may receive the first security policy directly in the request (e.g., the data encoding the policy may be included in the request) whereas the second security policy is indirectly referenced in the request (e.g., the request is a request to determine whether the first security policy complies with a standard security policy). In such an embodiment, the policy analyzer service may obtain the second security policy using the information included in the request that specifies the second security policy and then obtain the second propositional logic expression using the obtained second security policy.

The policy analyzer service may determine whether 608 the first propositional logic expression and the second propositional logic expression are equivalent. Two policies may be said to be equivalent if the security permissions from the first policy and the second policy apply in the same manner to all actions, resources, and principals—in other words, for any given set of actions, resources, and principals, that the first policy and the second policy will both either deny access (either explicitly based on a denial statement or implicitly based on the lack of a permission granting access) or both will grant access—it will not be the case that one policy grants access and the other denies access. In the case that one policy is determined to be more permissive than another policy, it will be the case that one policy grants access under a set of parameters where the another policy denies access.

A satisfiability engine may be used to analyze the permissiveness of two or more propositional logic expressions, which includes determining whether two propositional logic expressions are equivalent. The satisfiability engine may be used to verify whether the propositional logic constraints (e.g., those obtained from the first and second propositional logic expressions and those generated by the satisfiability engine) are equivalent. In some embodiments, determining whether two or more propositional logic expressions are equivalent may be implemented at least in part using a SMT solver such as Z3. More generally, techniques described herein for determining the permissiveness, relative permissiveness, and/or equivalency of propositional logic expressions and propositional logic constraints may be used in connection with determining whether 608 the first propositional logic expression and the second propositional logic expression are equivalent.

In some embodiments, the method may include performing one or more translations so that the security policies are mapped to propositional logic expressions in a particular format recognized by a SMT solver. For example, if a Z3 solver is used in connection with determining equivalency, then the security policies may be mapped to a format in accordance with a SMT-LIB standard language such as the STM-LIB 2.0 standard.

If the policy analyzer service determines that the first propositional logic expression and the second propositional logic expression are equivalent, then the policy analyzer service may provide 614 an indication that the policies are equivalent. In some embodiments, the indication may be encoded in response to a web API request.

However, if the policy analyzer service determines that the first propositional logic expression and the second propositional logic expression are not equivalent, then the policy analyzer service may identify 610 a set of parameters that is sufficient to determine that the first propositional logic expression and the second propositional logic expression lack equivalency. The set of parameters may encode one or more resources, one or more principals, one or more actions, or some combination thereof. In some embodiments, the set of parameters may be used to demonstrate that the first security policy corresponding to the first propositional logic and the second security policy corresponding to the second propositional logic are not equivalent because the result of evaluating the first security policy using the set of parameters—in other words, whether the result is a grant of access or a denial of access—is different from the result of evaluating the second security policy using the same set of parameters. Said differently, for a particular set of parameters, it may be the case that the first security policy grants access based on those parameters and the second security policy denies access based on those same parameters, or vice versa. In some embodiments, the policy analyzer service may identify 610 the set of parameters as part of determining whether 608 the propositional logic expressions are equivalent. In some cases, the policy analyzer service may provide the set of parameters as part of a web API response as an indication that the security policies are not equivalent. In some embodiments, the set of parameters may not be provided, but instead, an indication (e.g., a return code) may indicate whether the policies are equivalent. For example, a Boolean value may be returned such that TRUE is returned if the security policies are equivalent and FALSE is returned if they are not equivalent. Alternatively, an integer value may be returned such that 0 is returned if the security policies are equivalent, −1 is returned if the first security policy is more permissive than the second security policy, and 1 is returned if the second security policy is more permissive than the first security policy.

The order of various steps shown in the method are merely illustrative, and it may be the case that the determining 606 of the second propositional logic expression may occur either before and/or in parallel with the determining 604 of the first propositional logic expression. In fact, the ordering may even be nondeterministic in some embodiments. For example, the determinations 604 and 606 may be farmed out to separate compute instances of a pool of compute instances which may be run in parallel and may have different computational performance characteristics.

Note the intent-based governance service 100 can audit the use of resources that do not conform with the specified governance requirements. To evaluate the governance requirements for access control information across different resources, e.g., service control policies from organizations, policies attached to identity and access management roles and identities, permission boundaries, scope policies, and policies attached to the resources are looked at to provide insights into what access control is allowed and what is denied. Similarly, to evaluate controls around instance networks, the intent-based governance service 100 uses information about access to networks.

Figure 7:
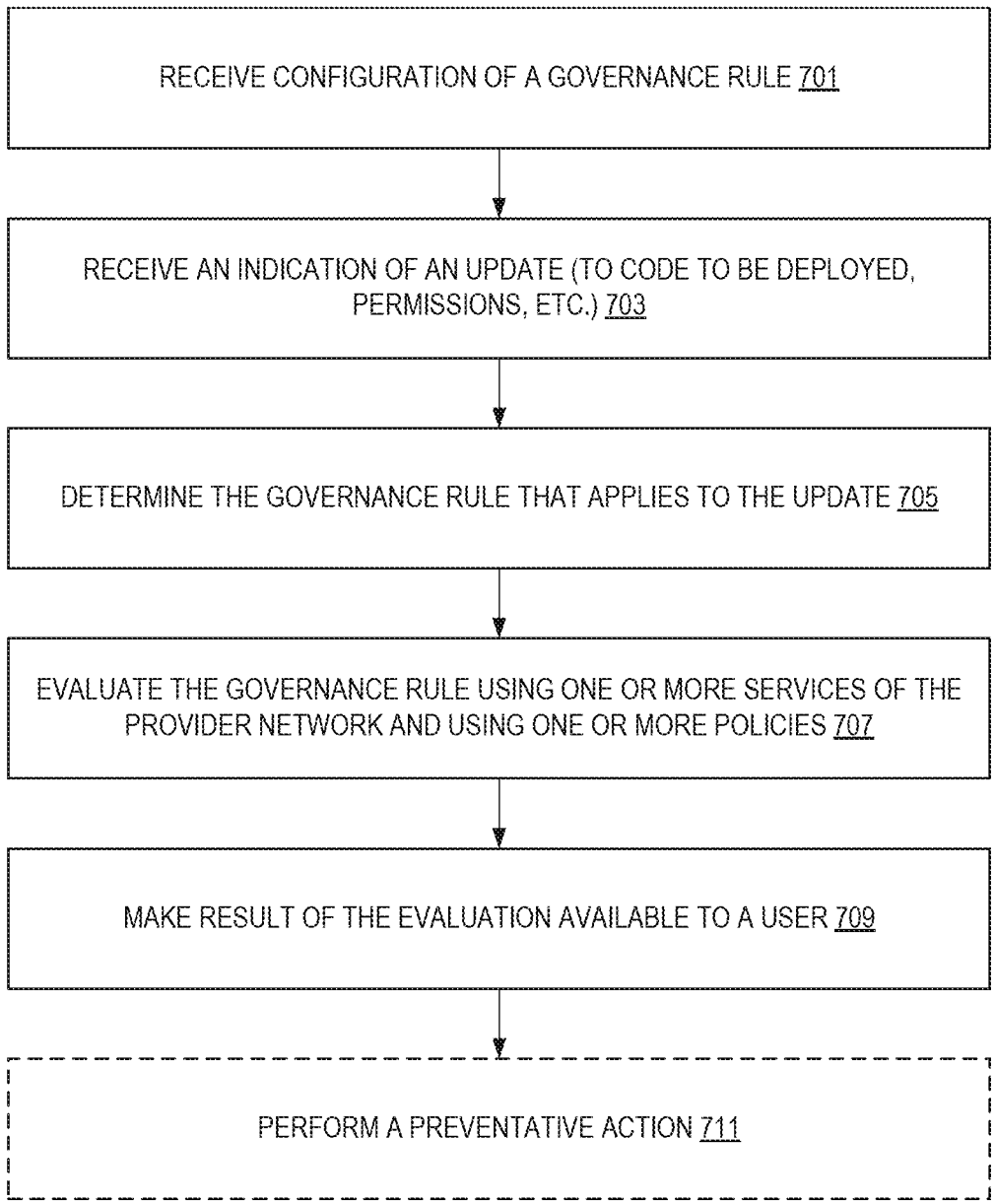
FIG. 7 is a flow diagram illustrating operations of a method according to some embodiments.

FIG. 7 is a flow diagram illustrating operations of a method according to some embodiments. Some or all of the operations (or other methods described herein, or variations, and/or combinations thereof) are performed under the control of one or more computer systems configured with executable instructions and are implemented as code (e.g., executable instructions, one or more computer programs, or one or more applications) executing collectively on one or more systems, by hardware or combinations thereof. The code is stored on a computer-readable storage medium, for example, in the form of a computer program comprising instructions executable by one or more systems. The computer-readable storage medium is non-transitory. In some embodiments, one or more (or all) of the operations are performed by the services of the other figures such as the intent-based governance service 100 and/or services 103-109.

At 701, a configuration of a governance requirement rule is received. For example, the governance requirements rule indicates an enforcement type (preventative and/or audit), if an existing rule is to be enabled, what organization or accounts the rule is to apply to (such as values for principals, accounts, resource names, source IPs, source virtual networks, tags, CIDRs, etc. based on their data privacy, network control, and encryption requirements).

An indication of an update regarding a policy, code, a network configuration, or a governance requirement rule itself, etc. is received at 703. For example, the configuration service 109 becomes aware of an update impacting a resource such as a policy, code, a network configuration, or a governance requirement rule itself and provides this indication to the intent-based governance service 100. In some instances, the indication is provided by a user.

A determination of which governance requirement rule(s) to apply to the indicated update is made at 705. As noted above, rules contain configurable information about what resources including organization or accounts the rule is to apply to (such as values for principals, accounts, resource names, source IPs, source virtual networks, tags, CIDRs, etc. based on their data privacy, network control, and encryption requirements) and, potentially, an indication of one or more policies to apply. For example, not all governance requirement rules may need to be evaluated for a code change. For example, if the code change does not appear to change how a financial report is to be handled, a rule pertaining to financial reports likely does not need to be run. However, in some embodiments, all governance requirement rule(s) are run. Exemplary mappings of rules to services include, but are not limited to: code changes call the API evaluation service(s) 103 and/or preventative check service(s) 106, network changes call the network evaluation service(s) 105 and/or preventative check service(s) 106, policy changes call the policy evaluation service(s) 107 and/or preventative check service(s) 106, etc. Note in some instances an audit based service may be used instead of the preventative check service(s) 106.

The impacted governance requirement rule(s) are evaluated for compliance using one or more reasoning engines according to one or more policies using one or more services at 707. In some embodiments, this evaluation does not occur as each change is made, but is instead made after a threshold number of changes have been made. In other embodiments, higher priority governance requirement rules are evaluated first.

At 709, the result(s) of the evaluation are made available to a user. For example, a graphical user interface is populated with a result. Note that the result(s) are only displayed upon a request by a user in some embodiments. In some embodiments, a notification is sent to an administrator noting that a result is available. The result of the evaluation may include an indication of what caused a violation (if there is one). When there are violations, such as a code change that violated a governance requirement rule, in some embodiments, not only is there an indication of what caused the violation, bit there is also an indication of who made the change, when it was made, and/or who the reviewer was. Examples of methods of governance requirement rule evaluation have been detailed at least with respect to FIGS. 3, 4, and 6.

In some embodiments, when there is a violation, a preventative action is performed at 711 such as not allowing code to be deployed or blocking a create, read, update, or delete action (such as not allowing a network or instance configuration change, etc. be utilized).

FIG. 8 illustrates embodiments of a graphical user interface for intent-based governance. In this illustration, a user is presented with a graphical user interface 801 to be used to select which governance requirement rules to utilize. As shown, a search component 803 allows for a user to search for governance requirement rules. Each rule is shown by its name, a description of what the rule applies to, a selectable enforcement type (preventative and/or audit), and/or if the rule is on by default.

FIG. 9 illustrates embodiments of a graphical user interface for status of one more enabled rules for intent-based governance. In this illustration, a user is presented with a graphical user interface 901 to be used to determine status of one or more rules. As shown, a search component 903 allows for a user to search for governance requirement rules that are currently enabled. In this example, two of the rules indicate compliance, but the "NoPublicAccess" rule indicates that there is a violation somewhere.

In most embodiments, a user can select each of the rules from this interface to get more details. FIG. 10 illustrates embodiments of a graphical user interface for intent-based governance for a particular rule status. In this illustration, a user is presented with a graphical user interface 1001 to be used to see the status of resources of a rule. As shown, a search component 903 allows for a user to search for resources. In this example, the FinancialReports resource for account 111122223333 is in violation. As shown, this interface allows one to see different resources, their types, accounts impacted, and a status.

Figure 11:
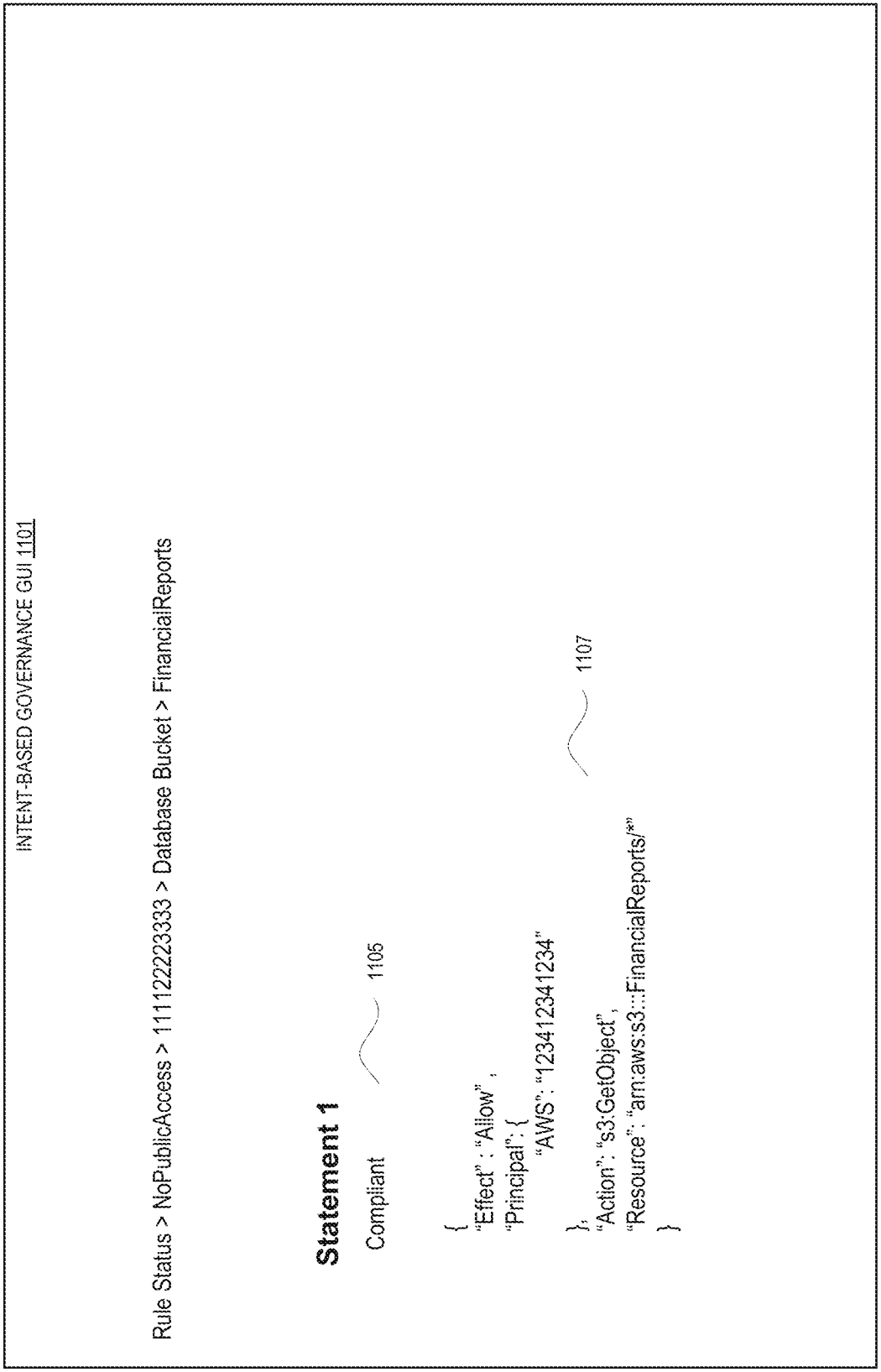
FIG. 11 illustrates embodiments of a graphical user interface for intent-based governance for a particular rule status resource.
Figure 12:
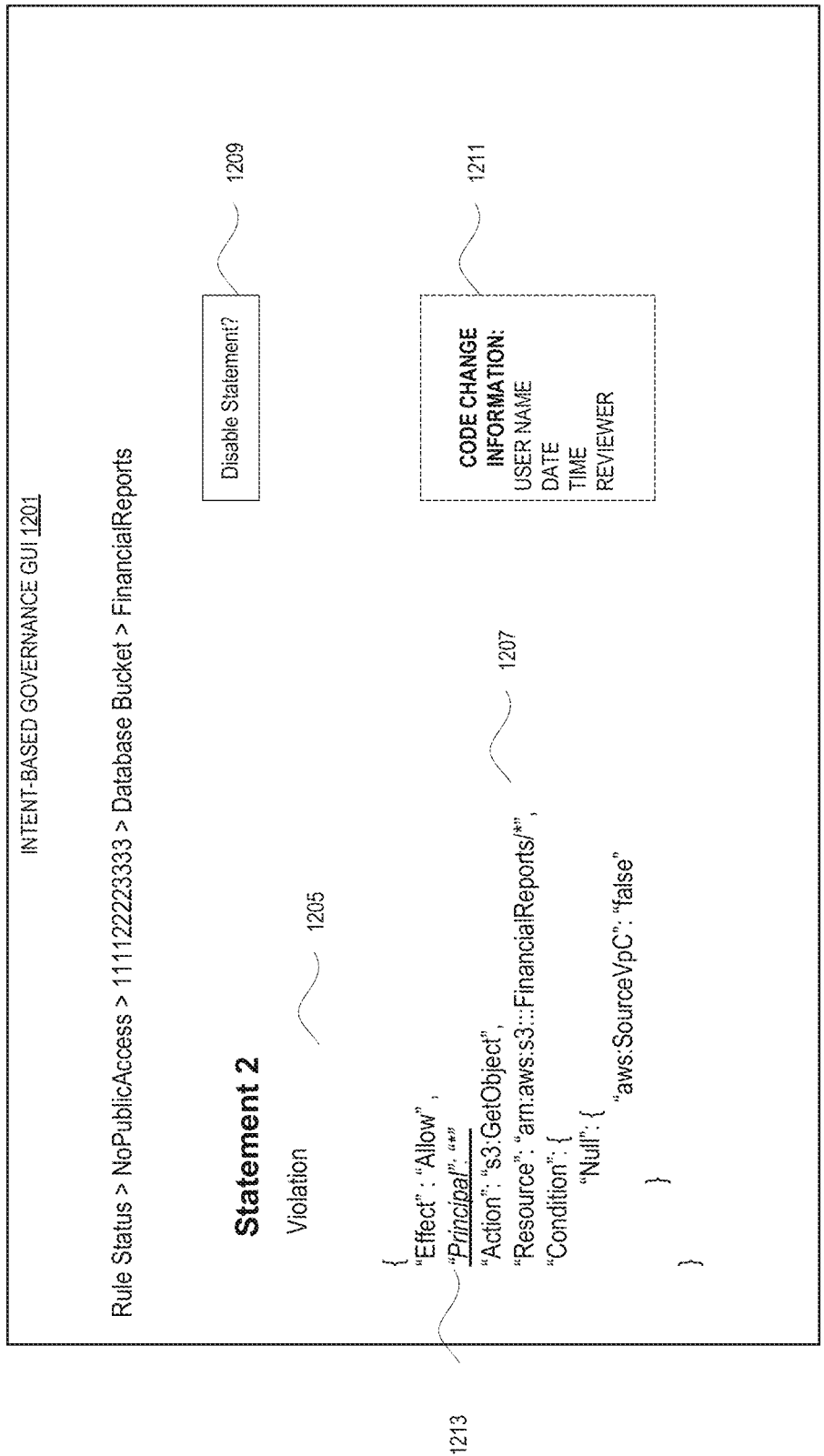
FIG. 12 illustrates embodiments of a graphical user interface for intent-based governance for a particular rule status resource where there is a violation.

FIG. 11 illustrates embodiments of a graphical user interface 1101 for intent-based governance for a particular rule status resource. In this illustration, a statement from the FinancialReports resource is shown. The code of the statement 1107 is shown along with its compliance status 1105. The indication of the previous figure was that some aspect of this resource was in violation of allowing public access to private networks or resources. As shown, a particular principal is allowed access to this resource and per an access policy is allowed to see this report. FIG. 12 illustrates embodiments of a graphical user interface 1201 for intent-based governance for a particular rule status resource where there is a violation. The same resource is impacted, but the compliance status 1205 indicates that there is a violation. As highlighted in the code 1207, the "Principal" is not limited to any particular user 1213. As such, anyone can see the FinacialReports resource. This graphical user interface 1201 includes a means to disable the statement 1209 in some embodiments meaning that this code is no longer active and in use. Further, in some embodiments, an indication 1211 of the user name that made the change, when the change was made, and/or the reviewer of that change is also provided.

FIG. 13 illustrates embodiments of a graphical user interface 1301 for intent-based governance for a violation of code 1303. In particular, this is a violation of an EncryptionAlert rule as potentially all data is not encrypted. In particular, "ciphertext" of line 57 is not actually encrypted as the encodeToString function does not call a cipher routine as shown in text box 1305.

Figure 14:
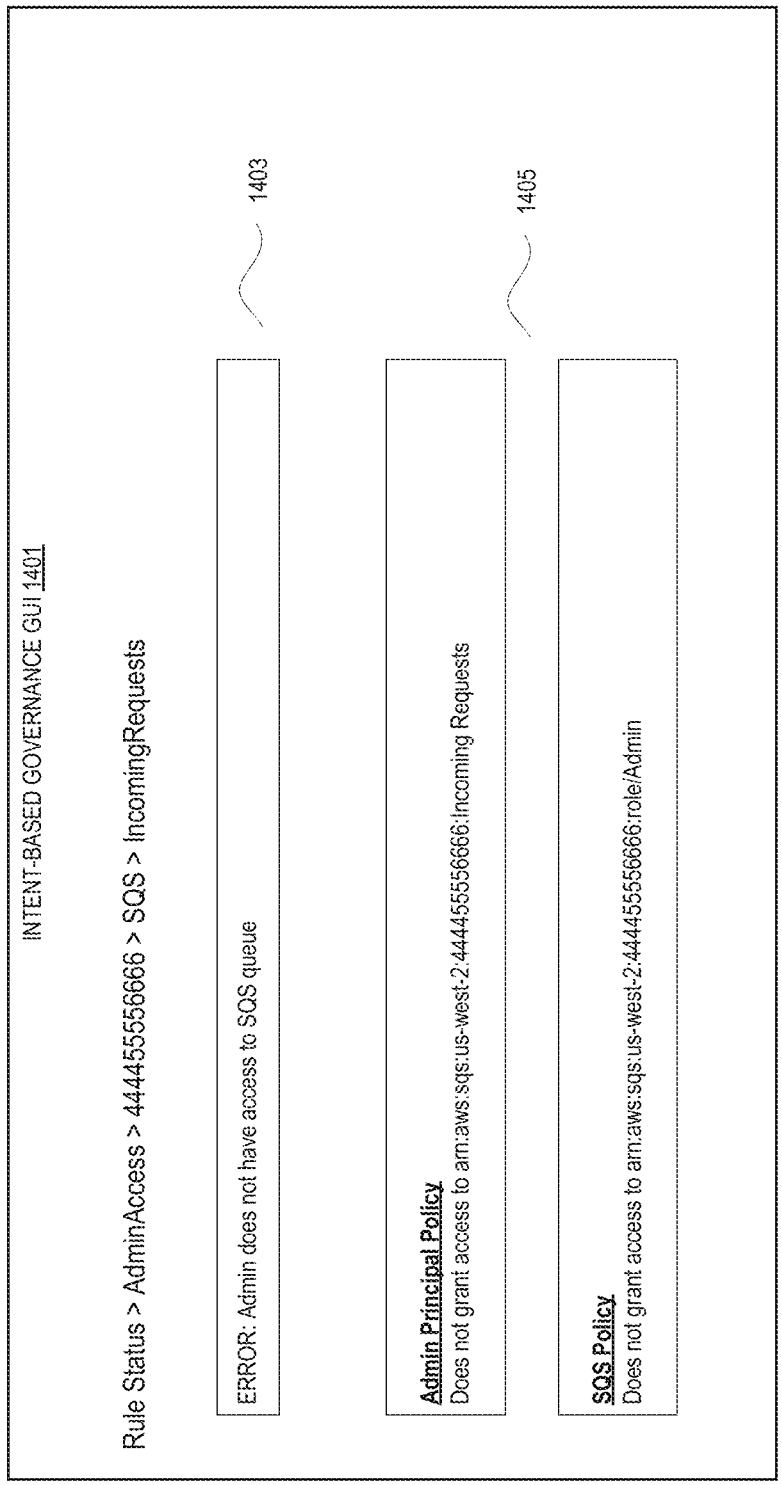
FIG. 14 illustrates embodiments of a graphical user interface for intent-based governance for a violation of message queue resource.

FIG. 14 illustrates embodiments of a graphical user interface 1401 for intent-based governance for a violation of message queue resource. The error is shown in text box 1403 and which policies are in violation are shown in 1405.

Figure 15:
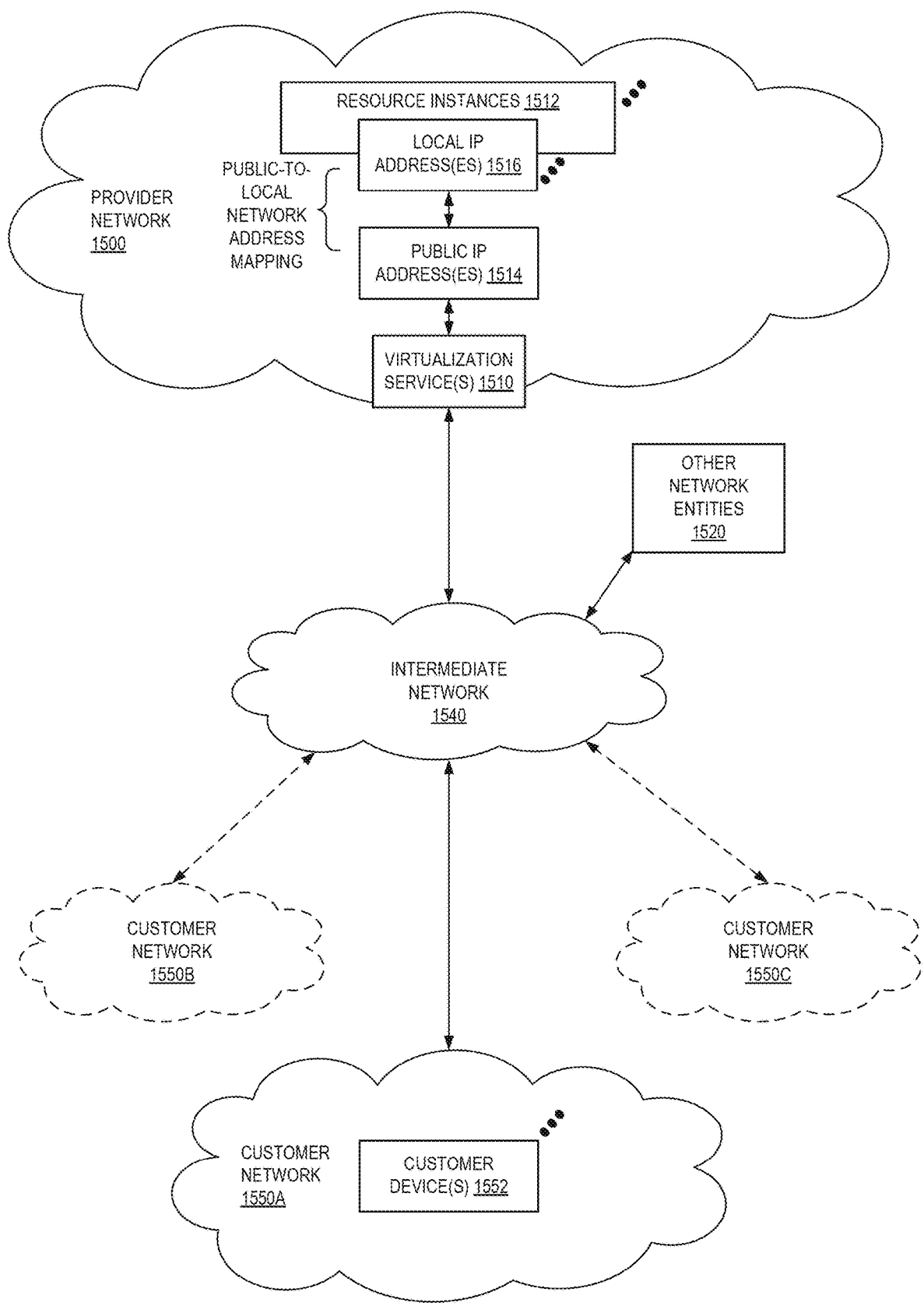
FIG. 15 illustrates an example provider network environment according to some embodiments.

FIG. 15 illustrates an example provider network (or "service provider system") environment according to some embodiments. A provider network 1500 may provide resource virtualization to customers via one or more virtualization services 1510 that allow customers to purchase, rent, or otherwise obtain instances 1512 of virtualized resources, including but not limited to computation and storage resources, implemented on devices within the provider network or networks in one or more data centers. Local Internet Protocol (IP) addresses 1516 may be associated with the resource instances 1512; the local IP addresses are the internal network addresses of the resource instances 1512 on the provider network 1500. In some embodiments, the provider network 1500 may also provide public IP addresses 1514 and/or public IP address ranges (e.g., Internet Protocol version 4 (IPv4) or Internet Protocol version 6 (IPv6) addresses) that customers may obtain from the provider 1500.

Conventionally, the provider network 1500, via the virtualization services 1510, may allow a customer of the service provider (e.g., a customer that operates one or more client networks 1550A-1550C including one or more customer device(s) 1552) to dynamically associate at least some public IP addresses 1514 assigned or allocated to the customer with particular resource instances 1512 assigned to the customer. The provider network 1500 may also allow the customer to remap a public IP address 1514, previously mapped to one virtualized computing resource instance 1512 allocated to the customer, to another virtualized computing resource instance 1512 that is also allocated to the customer. Using the virtualized computing resource instances 1512 and public IP addresses 1514 provided by the service provider, a customer of the service provider such as the operator of customer network(s) 1550A-1550C may, for example, implement customer-specific applications and present the customer's applications on an intermediate network 1540, such as the Internet. Other network entities 1520 on the intermediate network 1540 may then generate traffic to a destination public IP address 1514 published by the customer network(s) 1550A-1550C; the traffic is routed to the service provider data center, and at the data center is routed, via a network substrate, to the local IP address 1516 of the virtualized computing resource instance 1512 currently mapped to the destination public IP address 1514. Similarly, response traffic from the virtualized computing resource instance 1512 may be routed via the network substrate back onto the intermediate network 1540 to the source entity 1520.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1500; a customer may then assign their allocated public IP addresses to particular resource instances allocated to the customer. These public IP addresses may be referred to as customer public IP addresses, or simply customer IP addresses. Instead of being assigned by the provider network 1500 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 16:
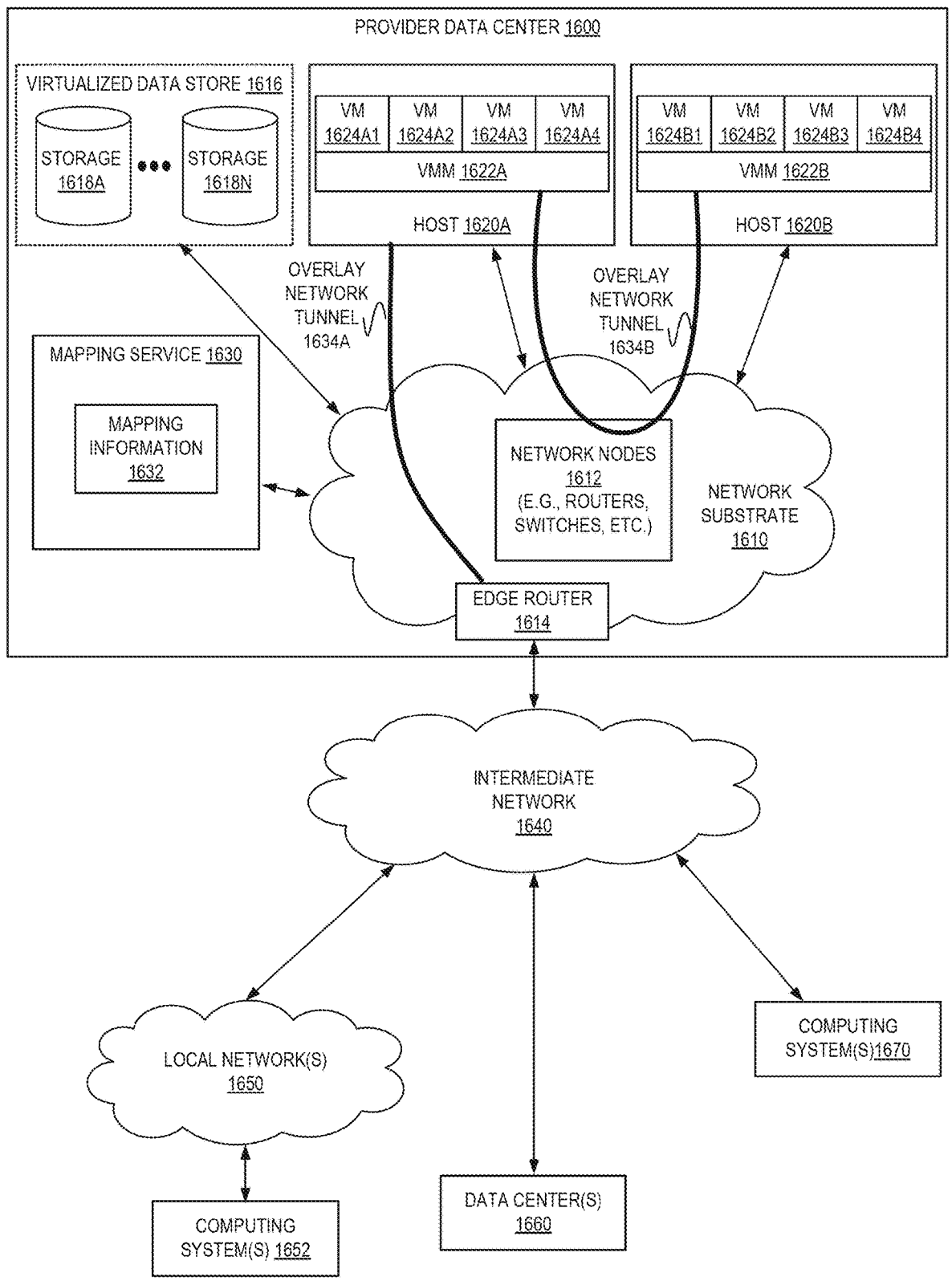
FIG. 16 illustrates an example data center that implements an overlay network on a network substrate using IP tunneling technology according to some embodiments.

FIG. 16 illustrates an example data center that implements an overlay network on a network substrate using IP tunneling technology, according to some embodiments. A provider data center 1600 may include a network substrate that includes networking nodes 1612 such as routers, switches, network address translators (NATs), and so on, which may be implemented as software, hardware, or as a combination thereof. Some embodiments may employ an Internet Protocol (IP) tunneling technology to provide an overlay network via which encapsulated packets may be passed through network substrate 1610 using tunnels. The IP tunneling technology may provide a mapping and encapsulating system for creating an overlay network on a network (e.g., a local network in data center 1600 of FIG. 16) and may provide a separate namespace for the overlay layer (the public IP addresses) and the network substrate 1610 layer (the local IP addresses). Packets in the overlay layer may be checked against a mapping directory (e.g., provided by mapping service 1630) to determine what their tunnel substrate target (local IP address) should be. The IP tunneling technology provides a virtual network topology (the overlay network); the interfaces (e.g., service APIs) that are presented to customers are attached to the overlay network so that when a customer provides an IP address to which the customer wants to send packets, the IP address is run in virtual space by communicating with a mapping service (e.g., mapping service 1630) that knows where the IP overlay addresses are.

In some embodiments, the IP tunneling technology may map IP overlay addresses (public IP addresses) to substrate IP addresses (local IP addresses), encapsulate the packets in a tunnel between the two namespaces, and deliver the packet to the correct endpoint via the tunnel, where the encapsulation is stripped from the packet. In FIG. 16, an example overlay network tunnel 1634A from a virtual machine (VM) 1624A (of VMs 1624A1-1624A4, via VMM 1622A) on host 1620A to a device on the intermediate network 1650 and an example overlay network tunnel 1634B between a VM 1624A (of VMs 1624A1-1624A4, via VMM 1622A) on host 1620A and a VM 1624B (of VMs 1624B1-1624B4, via VMM 1622B) on host 1620B are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (local IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the local IP addresses.

Referring to FIG. 16, at least some networks in which embodiments may be implemented may include hardware virtualization technology that enables multiple operating systems to run concurrently on a host computer (e.g., hosts 1620A and 1620B of FIG. 16), i.e. as virtual machines (VMs) 1624 on the hosts 1620. The VMs 1624 may, for example, be executed in slots on the hosts 1620 that are rented or leased to customers of a network provider. A hypervisor, or virtual machine monitor (VMM) 1622, on a host 1620 presents the VMs 1624 on the host with a virtual platform and monitors the execution of the VMs 1624. Each VM 1624 may be provided with one or more local IP addresses; the VMM 1622 on a host 1620 may be aware of the local IP addresses of the VMs 1624 on the host. A mapping service 1630 may be aware of (e.g., via stored mapping information 1632) network IP prefixes and IP addresses of routers or other devices serving IP addresses on the local network. This includes the IP addresses of the VMMs 1622 serving multiple VMs 1624. The mapping service 1630 may be centralized, for example on a server system, or alternatively may be distributed among two or more server systems or other devices on the network. A network may, for example, use the mapping service technology and IP tunneling technology to, for example, route data packets between VMs 1624 on different hosts 1620 within the data center 1600 network; note that an interior gateway protocol (IGP) may be used to exchange routing information within such a local network.

In addition, a network such as the provider data center 1600 network (which is sometimes referred to as an autonomous system (AS)) may use the mapping service technology, IP tunneling technology, and routing service technology to route packets from the VMs 1624 to Internet destinations, and from Internet sources to the VMs 1624. Note that an external gateway protocol (EGP) or border gateway protocol (BGP) is typically used for Internet routing between sources and destinations on the Internet. FIG. 16 shows an example provider data center 1600 implementing a network that provides resource virtualization technology and that provides full Internet access via edge router(s) 1614 that connect to Internet transit providers, according to some embodiments. The provider data center 1600 may, for example, provide customers the ability to implement virtual computing systems (VMs 1624) via a hardware virtualization service and the ability to implement virtualized data stores 1616 on storage resources 1618A-1618N via a storage service.

The data center 1600 network may implement IP tunneling technology, mapping service technology, and a routing service technology to route traffic to and from virtualized resources, for example to route packets from the VMs 1624 on hosts 1620 in data center 1600 to Internet destinations, and from Internet sources to the VMs 1624. Internet sources and destinations may, for example, include computing systems 1670 connected to the intermediate network 1640 and computing systems 1652 connected to local networks 1650 that connect to the intermediate network 1640 (e.g., via edge router(s) 1614 that connect the network 1650 to Internet transit providers). The provider data center 1600 network may also route packets between resources in data center 1600, for example from a VM 1624 on a host 1620 in data center 1600 to other VMs 1624 on the same host or on other hosts 1620 in data center 1600.

A service provider that provides data center 1600 may also provide additional data center(s) 1660 that include hardware virtualization technology similar to data center 1600 and that may also be connected to intermediate network 1640. Packets may be forwarded from data center 1600 to other data centers 1660, for example from a VM 1624 on a host 1620 in data center 1600 to another VM on another host in another, similar data center 1660, and vice versa.

While the above describes hardware virtualization technology that enables multiple operating systems to run concurrently on host computers as virtual machines (VMs) on the hosts, where the VMs may be instantiated on slots on hosts that are rented or leased to customers of the network provider, the hardware virtualization technology may also be used to provide other computing resources, for example storage resources 1618A-1618N, as virtualized resources to customers of a network provider in a similar manner.

Figure 17:
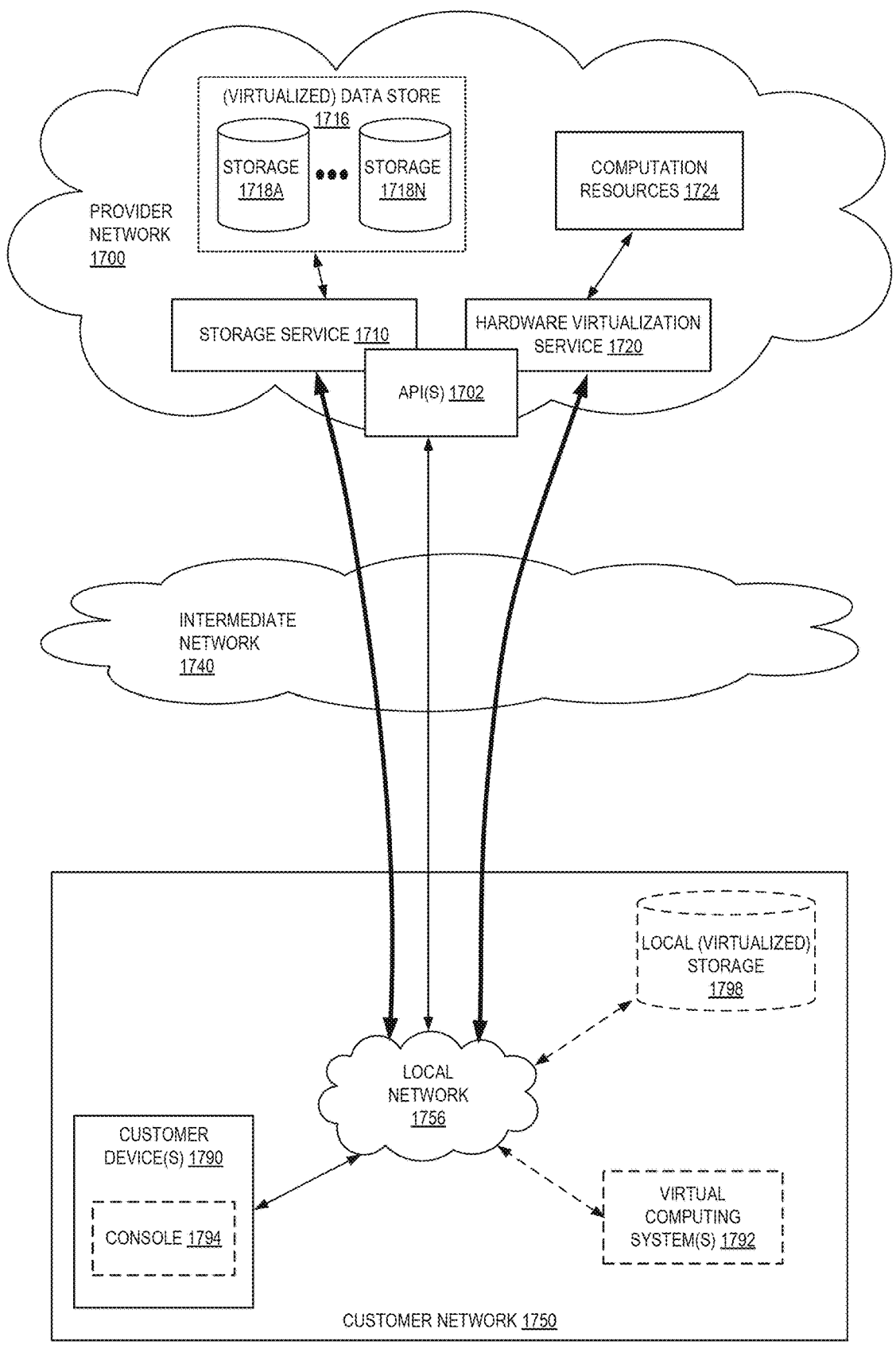
FIG. 17 is a block diagram of an example provider network that provides a storage service and a hardware virtualization service to customers according to some embodiments.

FIG. 17 is a block diagram of an example provider network that provides a storage service and a hardware virtualization service to customers, according to some embodiments. Hardware virtualization service 1720 provides multiple computation resources 1724 (e.g., VMs) to customers. The computation resources 1724 may, for example, be rented or leased to customers of the provider network 1700 (e.g., to a customer that implements customer network 1750). Each computation resource 1724 may be provided with one or more local IP addresses. Provider network 1700 may be configured to route packets from the local IP addresses of the computation resources 1724 to public Internet destinations, and from public Internet sources to the local IP addresses of computation resources 1724.

Provider network 1700 may provide a customer network 1750, for example coupled to intermediate network 1740 via local network 1756, the ability to implement virtual computing systems 1792 via hardware virtualization service 1720 coupled to intermediate network 1740 and to provider network 1700. In some embodiments, hardware virtualization service 1720 may provide one or more APIs 1702, for example a web services interface, via which a customer network 1750 may access functionality provided by the hardware virtualization service 1720, for example via a console 1794 (e.g., a web-based application, standalone application, mobile application, etc.). In some embodiments, at the provider network 1700, each virtual computing system 1792 at customer network 1750 may correspond to a computation resource 1724 that is leased, rented, or otherwise provided to customer network 1750.

From an instance of a virtual computing system 1792 and/or another customer device 1790 (e.g., via console 1794), the customer may access the functionality of storage service 1710, for example via one or more APIs 1702, to access data from and store data to storage resources 1718A-1718N of a virtual data store 1716 (e.g., a folder or "bucket", a virtualized volume, a database, etc.) provided by the provider network 1700. In some embodiments, a virtualized data store gateway (not shown) may be provided at the customer network 1750 that may locally cache at least some data, for example frequently-accessed or critical data, and that may communicate with storage service 1710 via one or more communications channels to upload new or modified data from a local cache so that the primary store of data (virtualized data store 1716) is maintained. In some embodiments, a user, via a virtual computing system 1792 and/or on another customer device 1790, may mount and access virtual data store 1716 volumes via storage service 1710 acting as a storage virtualization service, and these volumes may appear to the user as local (virtualized) storage 1798.

While not shown in FIG. 17, the virtualization service(s) may also be accessed from resource instances within the provider network 1700 via API(s) 1702. For example, a customer, appliance service provider, or other entity may access a virtualization service from within a respective virtual network on the provider network 1700 via an API 1702 to request allocation of one or more resource instances within the virtual network or within another virtual network.

Figure 18:
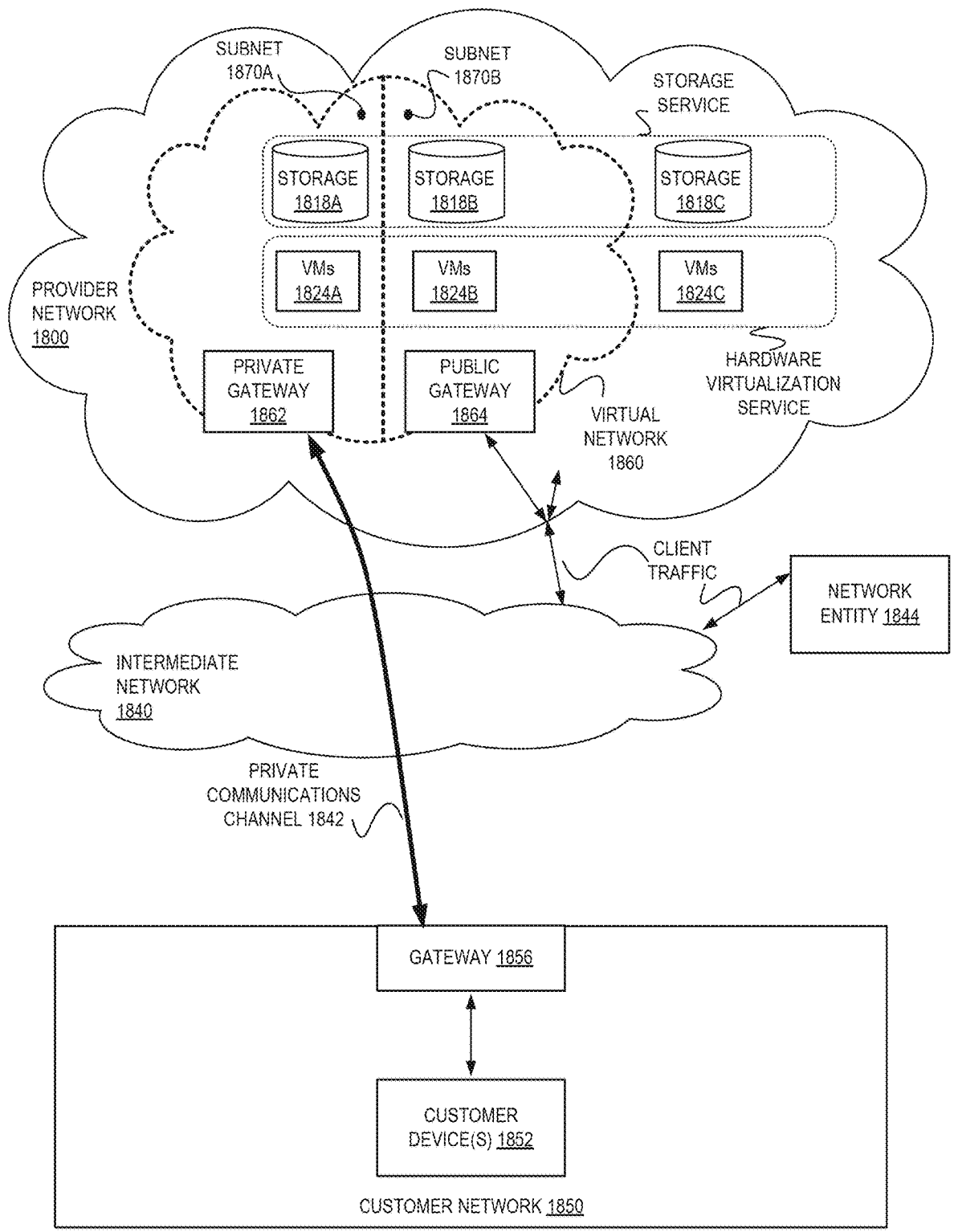
FIG. 18 illustrates an example provider network that provides virtual networks on the provider network to at least some customers according to some embodiments.

FIG. 18 illustrates an example provider network that provides virtual networks on the provider network to at least some customers, according to some embodiments. A customer's virtual network 1860 on a provider network 1800, for example, enables a customer to connect their existing infrastructure (e.g., one or more customer devices 1852) on customer network 1850 to a set of logically isolated resource instances (e.g., VMs 1824A and 1824B and storage 1818A and 1818B), and to extend management capabilities such as security services, firewalls, and intrusion detection systems to include their resource instances.

A customer's virtual network 1860 may be connected to a customer network 1850 via a private communications channel 1842. A private communications channel 1842 may, for example, be a tunnel implemented according to a network tunneling technology or some other technology over an intermediate network 1840. The intermediate network may, for example, be a shared network or a public network such as the Internet. Alternatively, a private communications channel 1842 may be implemented over a direct, dedicated connection between virtual network 1860 and customer network 1850.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In some embodiments, either a shared network or a public network may serve as an intermediate network between a provider network and a customer network.

To establish a virtual network 1860 for a customer on provider network 1800, one or more resource instances (e.g., VMs 1824A and 1824B and storage 1818A and 1818B) may be allocated to the virtual network 1860. Note that other resource instances (e.g., storage 1818C and VMs 1824C) may remain available on the provider network 1800 for other customer usage. A range of public IP addresses may also be allocated to the virtual network 1860. In addition, one or more networking nodes (e.g., routers, switches, etc.) of the provider network 1800 may be allocated to the virtual network 1860. A private communications channel 1842 may be established between a private gateway 1862 at virtual network 1860 and a gateway 1856 at customer network 1850.

In some embodiments, in addition to, or instead of, a private gateway 1862, virtual network 1860 may include a public gateway 1864 that enables resources within virtual network 1860 to communicate directly with entities (e.g., network entity 1844) via intermediate network 1840, and vice versa, instead of or in addition to via private communications channel 1842.

Virtual network 1860 may be, but is not necessarily, subdivided into two or more subnetworks, or subnets, 1870. For example, in implementations that include both a private gateway 1862 and a public gateway 1864, a virtual network 1860 may be subdivided into a subnet 1870A that includes resources (VMs 1824A and storage 1818A, in this example) reachable through private gateway 1862, and a subnet 1870B that includes resources (VMs 1824B and storage 1818B, in this example) reachable through public gateway 1864.

The customer may assign particular customer public IP addresses to particular resource instances in virtual network 1860. A network entity 1844 on intermediate network 1840 may then send traffic to a public IP address published by the customer; the traffic is routed, by the provider network 1800, to the associated resource instance. Return traffic from the resource instance is routed, by the provider network 1800, back to the network entity 1844 over intermediate network 1840. Note that routing traffic between a resource instance and a network entity 1844 may require network address translation to translate between the public IP address and the local IP address of the resource instance.

Some embodiments may allow a customer to remap public IP addresses in a customer's virtual network 1860 as illustrated in FIG. 18 to devices on the customer's external network 1850. When a packet is received (e.g., from network entity 1844), the network 1800 may determine that the destination IP address indicated by the packet has been remapped to an endpoint on external network 1850 and handle routing of the packet to the respective endpoint, either via private communications channel 1842 or via the intermediate network 1840. Response traffic may be routed from the endpoint to the network entity 1844 through the provider network 1800, or alternatively may be directly routed to the network entity 1844 by the customer network 1850. From the perspective of the network entity 1844, it appears as if the network entity 1844 is communicating with the public IP address of the customer on the provider network 1800. However, the network entity 1844 has actually communicated with the endpoint on customer network 1850.

While FIG. 18 shows network entity 1844 on intermediate network 1840 and external to provider network 1800, a network entity may be an entity on provider network 1800. For example, one of the resource instances provided by provider network 1800 may be a network entity that sends traffic to a public IP address published by the customer.

Figure 19:
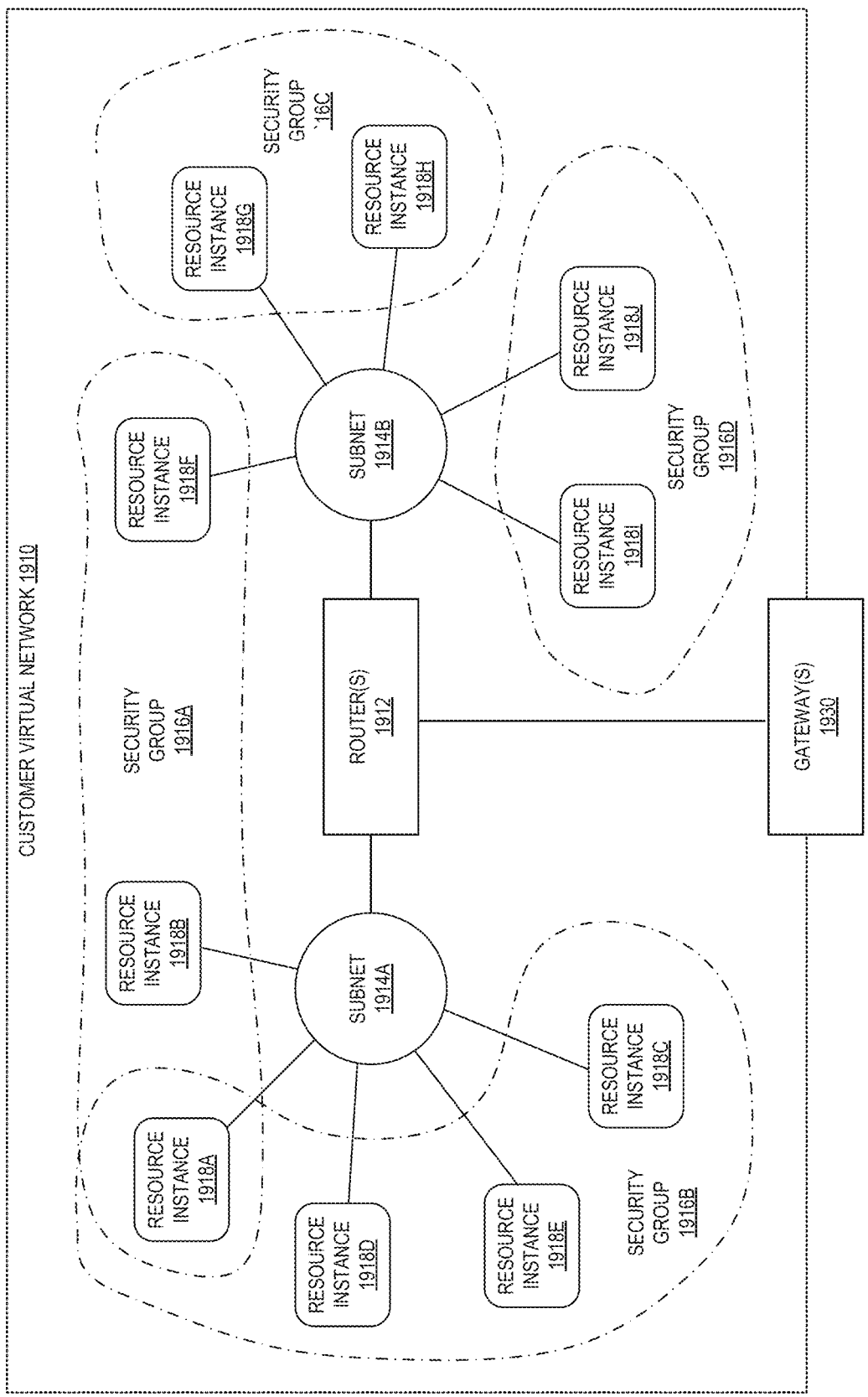
FIG. 19 illustrates subnets and security groups in an example virtual network on a provider network according to some embodiments.

FIG. 19 illustrates subnets and security groups in an example virtual network 1910 on a provider network, according to some embodiments. In some embodiments, a provider network such as provider network 1800 in FIG. 18 may allow the customer to establish and manage virtual security groups 1916 (e.g., 1916A-1916D) within the customer's virtual network 1910, within or across subnets 1914. A security group 1916 is a logical grouping of resource instances 1918 and acts as a virtual firewall that controls the traffic allowed to reach one or more resource instances 1918 within the security group 1916 according to security group rules. The customer may establish one or more security groups 1916 within the virtual network 1910, and may associate each resource instance 1918 in the virtual network 1910 with one or more of the security groups 1916. In some embodiments, the customer may establish and/or modify rules for each security group 1916 that control the inbound traffic allowed to reach the resource instances 1918 associated with the security group 1916.

In the example virtual network 1910 shown in FIG. 19, the virtual network 1910 is subdivided into two subnets 1914A and 1914B. Access to the virtual network 1910 is controlled by gateway(s) 1930. Each subnet 1914 may include at least one router 1912 that acts to route traffic to (and from) resource instances 1918 on the respective subnet 1914. In some embodiments, network access control lists (ACLs) may be used to control access to the subnets 1914 at router(s) 1912. In the example shown in FIG. 19, resource instances 1918A through 1918E are on subnet 1914A, and resource instances 1918F through 1918J are on subnet 1914B. The customer has established four security groups 1916A through 1916D. As shown in FIG. 19, a security group may extend across subnets 1914, as does security group 1916A that includes resource instances 1918A and 1918B on subnet 1914A and resource instance 1918F on subnet 1914B. In addition, a resource instance 1918 may be included in two or more security groups 1916, as is resource instance 1918A which is included in security group 1916A and 1916B.

Illustrative system

Figure 20:
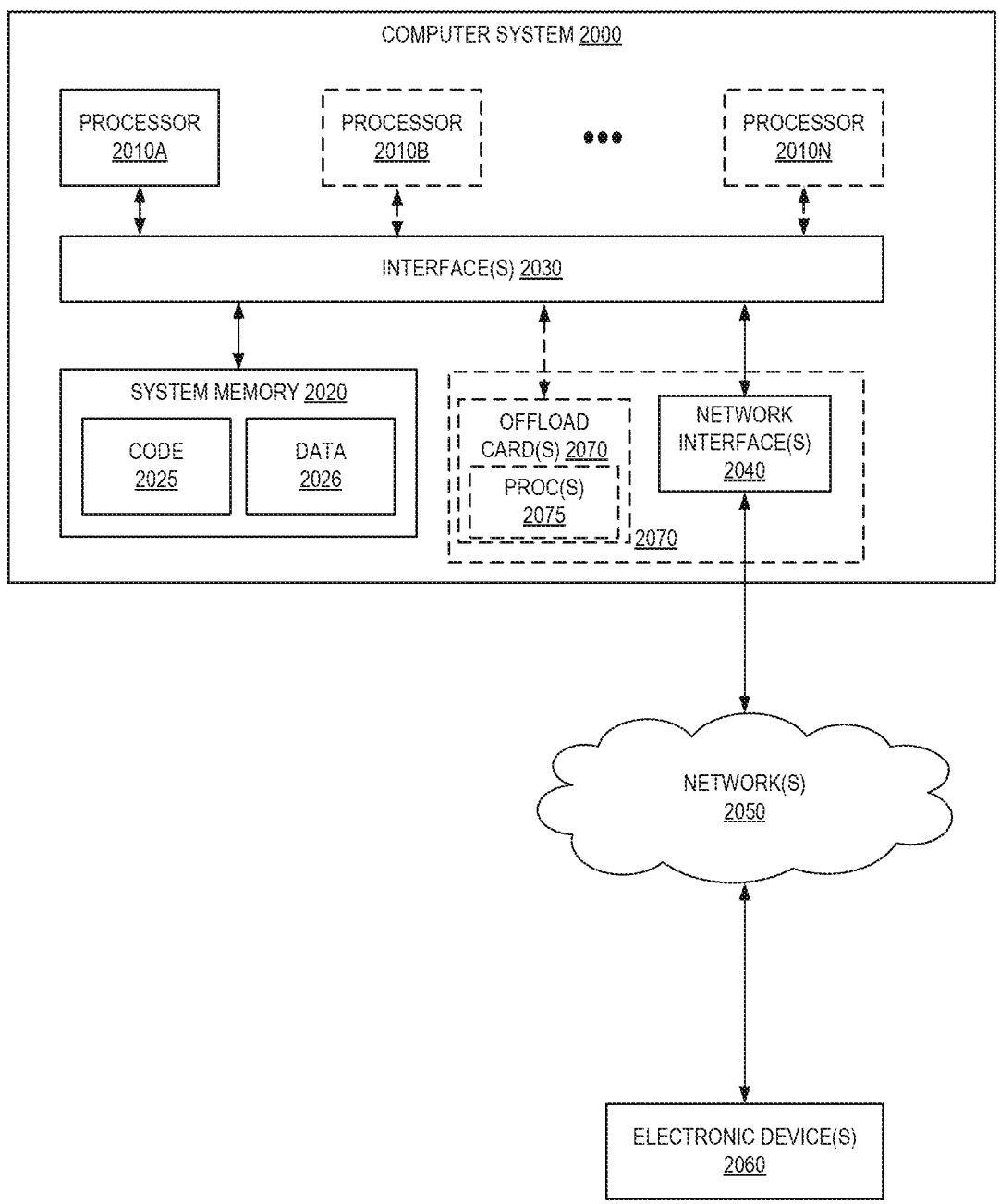
FIG. 20 is a block diagram illustrating an example computer system that may be used in some embodiments.

In some embodiments, a system that implements a portion or all of the techniques for intent-based governance as described herein may include a general-purpose computer system that includes or is configured to access one or more computer-accessible media, such as computer system 2000 illustrated in FIG. 20. In the illustrated embodiment, computer system 2000 includes one or more processors 2010 coupled to a system memory 2020 via an input/output (I/O) interface 2030. Computer system 2000 further includes a network interface 2040 coupled to I/O interface 2030. While FIG. 20 shows computer system 2000 as a single computing device, in various embodiments a computer system 2000 may include one computing device or any number of computing devices configured to work together as a single computer system 2000.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 2010 may commonly, but not necessarily, implement the same ISA.

System memory 2020 may store instructions and data accessible by processor(s) 2010. In various embodiments, system memory 2020 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 2020 as code 2025 and data 2026.

In one embodiment, I/O interface 2030 may be configured to coordinate I/O traffic between processor 2010, system memory 2020, and any peripheral devices in the device, including network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices 2060 attached to a network or networks 2050, such as other computer systems or devices as illustrated in FIG. 1, for example. In various embodiments, network interface 2040 may support communication via any suitable wired or wireless general data networks, such as types of Ethernet network, for example. Additionally, network interface 2040 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 2000 includes one or more offload cards 2070 (including one or more processors 2075, and possibly including the one or more network interfaces 2040) that are connected using an I/O interface 2030 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 2000 may act as a host electronic device (e.g., operating as part of a hardware virtualization service) that hosts compute instances, and the one or more offload cards 2070 execute a virtualization manager that can manage compute instances that execute on the host electronic device. As an example, in some embodiments the offload card(s) 2070 can perform compute instance management operations such as pausing and/or un-pausing compute instances, launching and/or terminating compute instances, performing memory transfer/copying operations, etc. These management operations may, in some embodiments, be performed by the offload card(s) 2070 in coordination with a hypervisor (e.g., upon a request from a hypervisor) that is executed by the other processors 2010A-2010N of the computer system 2000. However, in some embodiments the virtualization manager implemented by the offload card(s) 2070 can accommodate requests from other entities (e.g., from compute instances themselves), and may not coordinate with (or service) any separate hypervisor.

In some embodiments, system memory 2020 may be one embodiment of a computer-accessible medium configured to store program instructions and data as described above. However, in other embodiments, program instructions and/ or data may be received, sent or stored upon different types of computer-accessible media. Generally speaking, a computer-accessible medium may include non-transitory storage media or memory media such as magnetic or optical media, e.g., disk or DVD/CD coupled to computer system 2000 via I/O interface 2030. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

Figure 21:
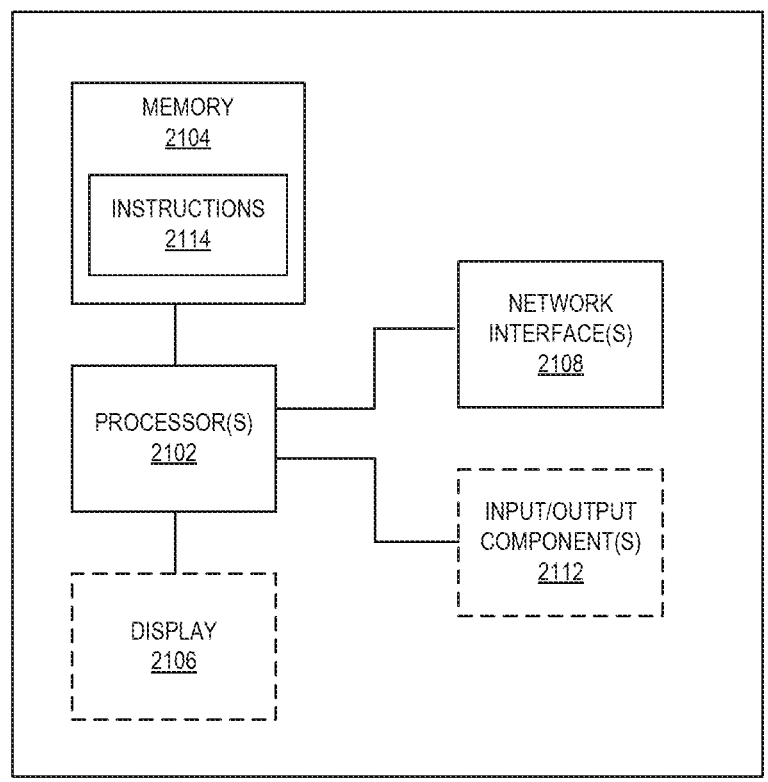
FIG. 21 illustrates a logical arrangement of a set of general components of an exemplary computing device that can be utilized in accordance with various embodiments.

FIG. 21 illustrates a logical arrangement of a set of general components of an example computing device 2100 such as the provider network, etc. Generally, a computing device 2100 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 2102 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 2104) to store code (e.g., instructions 2114) and/or data, and a set of one or more wired or wireless network interfaces 2108 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 2104) of a given electronic device typically stores code (e.g., instructions 2114) for execution on the set of one or more processors 2102 of that electronic device. One or more parts of various embodiments may be implemented using different combinations of software, firmware, and/or hardware.

A computing device 2100 can include some type of display element 2106, such as a touch screen or liquid crystal display (LCD), although many devices such as portable media players might convey information via other means, such as through audio speakers, and other types of devices such as server end stations may not have a display element 2106 at all. As discussed, some computing devices used in some embodiments include at least one input and/or output component(s) 2112 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 22:
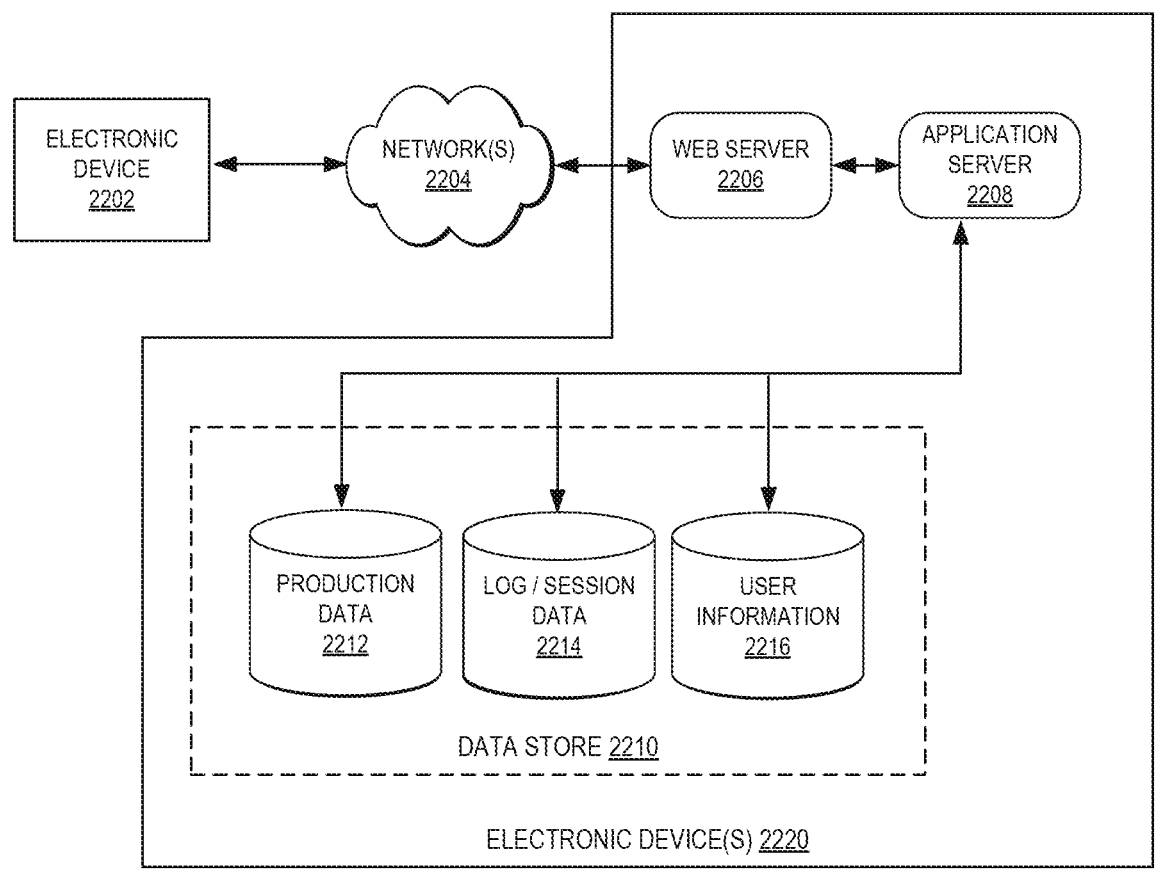
FIG. 22 illustrates an example of an environment for implementing aspects in accordance with various embodiments.

As discussed, different approaches can be implemented in various environments in accordance with the described embodiments. For example, FIG. 22 illustrates an example of an environment 2200 for implementing aspects in accordance with various embodiments. For example, in some embodiments requests are HyperText Transfer Protocol (HTTP) requests that are received by a web server (e.g., web server 2206), and the users, via electronic devices, may interact with the provider network via a web portal provided via the web server 2206 and application server 2208. As will be appreciated, although a web-based environment is used for purposes of explanation, different environments may be used, as appropriate, to implement various embodiments. The system includes an electronic client device 2202, which may also be referred to as a client device and can be any appropriate device operable to send and receive requests, messages or information over an appropriate network 2204 and convey information back to a user of the device 2202. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 2204 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 2204 includes the Internet, as the environment includes a web server 2206 for receiving requests and serving content in response thereto, although for other networks an alternative device serving a similar purpose could be used, as would be apparent to one of ordinary skill in the art.

The illustrative environment includes at least one application server 2208 and a data store 2210. It should be understood that there can be several application servers, layers, or other elements, methodes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 2208 can include any appropriate hardware and software for integrating with the data store 2210 as needed to execute aspects of one or more applications for the client device 2202 and handling a majority of the data access and business logic for an application. The application server 2208 provides access control services in cooperation with the data store 2210 and is able to generate content such as text, graphics, audio, video, etc., to be transferred to the client device 2202, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 2202 and the application server 2208, can be handled by the web server 2206. It should be understood that the web server 2206 and application server 2208 are not required and are merely example components, as structured code discussed herein can be executed on any appropriate device or host machine as discussed elsewhere herein.

The data store 2210 can include several separate data tables, databases, or other data storage mechanisms and media for storing data relating to a particular aspect. For example, the data store illustrated includes mechanisms for storing production data 2212 and user information 2216, which can be used to serve content for the production side. The data store 2210 also is shown to include a mechanism for storing log or session data 2214. It should be understood that there can be many other aspects that may need to be stored in the data store, such as page image information and access rights information, which can be stored in any of the above listed mechanisms as appropriate or in additional mechanisms in the data store 2210. The data store 2210 is operable, through logic associated therewith, to receive instructions from the application server 2208 and obtain, update, or otherwise method data in response thereto. In one example, a user might submit a search request for a certain type of item. In this case, the data store 2210 might access the user information 2216 to verify the identity of the user and can access a production data 2212 to obtain information about items of that type. The information can then be returned to the user, such as in a listing of results on a web page that the user is able to view via a browser on the user device 2202. Information for a particular item of interest can be viewed in a dedicated page or window of the browser.

The web server 2206, application server 2208, and/or data store 2210 may be implemented by one or more electronic devices 2220, which can also be referred to as electronic server devices or server end stations, and may or may not be located in different geographic locations. Each of the one or more electronic devices 2220 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 22. Thus, the depiction of the environment 2200 in FIG. 22 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1718A-1718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving one or more configurations for governance requirement rules;
receiving an indication of an update to one or more of code, a policy, a network configuration, or one of the governance requirement rules, the update impacting a resource in a provider network for an account that is to be analyzed using one or more of the governance requirement rules by an intent-based governance service;
determining the one or more of the governance requirement rules to evaluate for compliance after the update based on at least a type of the resource wherein the one or more of the governance requirement rules relates to code verification for a code segment;
evaluating the one or more of the governance requirement rules for compliance using one or more reasoning engines according to two or more policies, wherein evaluating the one or more of the governance requirement rules comprises:
generating one or more control flow graphs for the code segment; and
evaluating all paths of the one or more control flow graphs to determine whether the one or more of the governance requirement rules are not followed for a given application programming interface call in the code segment; and
displaying a result of the evaluating.

2. The computer-implemented method of claim 1, wherein the governance requirement rules include information about one or more of what organization or accounts respective ones of the rules are to apply to including one or more of values for principals, accounts, resource names, source address, source virtual networks, tags, classless inter-domain routing information, and policy information.

3. The computer-implemented method of claim 1, wherein the type of the resource is a compute resource, a data/storage resource, a network-related resource, an application resource, an access policy or role, an identity policy or role, or a machine image.

4. A computer-implemented method comprising:
receiving an indication of a change involving of one or more of code, a policy, a network configuration, or a governance requirement rule impacting a resource in a provider network for an account that is to be analyzed using one or more governance requirement rules;
determining one or more of the governance requirement rules to evaluate for compliance after the update;
evaluating the one or more of the governance requirement rules for compliance using one or more reasoning engines according to one or more policies, wherein the one or more of the governance requirement rules relates to networking information, and evaluating the one or more of the governance requirement rules comprises:
receiving a query about a virtual network on the provider network, wherein the query expresses a constraint problem;
obtaining descriptive information for the virtual network;
encoding the descriptive information according to a declarative logic programming language to generate an encoded description of the virtual network;
resolving the query for the encoded description according to encoded virtual networking rules using a constraint solver engine; and
obtaining a result; and
outputting the result.

5. The computer-implemented method of claim 4, wherein the one or more of the governance requirement rules are mapped to one or more compliance, security, or business requirements.

6. The computer-implemented method of claim 4, wherein the governance requirement rules include information about one or more of what organization or accounts respective ones of the rules are to apply to, including one or more of values for principals, accounts, resource names, source address, source virtual networks, tags, classless inter-domain routing information, and policy information.

7. The computer-implemented method of claim 4, wherein a type of the resource is a compute resource, a data/storage resource, a network-related resource, an application resource, an access policy or role, an identity policy or role, or a machine image.

8. The computer-implemented method of claim 4, further comprising, for a violation of the one or more of the governance requirements rules, tracking information about an actor that made the change.

9. The computer-implemented method of claim 4, wherein the indication of an update of a resource in a provider network is provided by a configuration service that monitors for code changes, networking changes, policy changes, and governance requirement rule changes.

10. The computer-implemented method of claim 4, wherein the governance requirement rules are audit type or preventative type.

11. A system comprising:
one or more data stores implemented by a first one or more electronic devices, the one or more data stores storing one or more of code, a policy, a network configuration, or governance requirement rules; and
an intent-based governance service implemented by a second one or more electronic devices, the intent-based governance service including instructions that upon execution cause the intent-based governance service to:
receive an indication of a change involving of one or more of the code, the policy, the network configuration, or the governance requirement rules, the change impacting a resource in a provider network for an account that is to be analyzed using one or more of the governance requirement rules;
determine the one or more of the governance requirement rules to evaluate for compliance after the update of the resource based on at least a type of the resource, wherein the one or more of the governance requirement rules relates to data privacy;
evaluate the one or more of the governance requirement rules for compliance using one or more reasoning engines according to one or more policies, wherein evaluating the one or more of the governance requirement rules comprises:
determining a first propositional logic based at least in part on a first set of security permissions;
determining a second propositional logic based at least in part on a second set of security permissions;
determining the first propositional logic and the second propositional logic lack equivalency using the first propositional logic and the second propositional logic; and
providing an indication that the first set of security permissions and the second set of security permissions lack equivalency; and
output a result of the evaluating.

12. The system of claim 11, wherein the governance requirement rules are mapped to one or more compliance, security, or business requirements.

13. The system of claim 11, wherein the governance requirement rules include information about one or more of what organization or accounts respective ones of the rules are to apply to including one or more of values for principals, accounts, resource names, source address, source virtual networks, tags, classless inter-domain routing information, and policy information.

14. The system of claim 11, wherein a type of the resource is a compute resource, a data/storage resource, a network-related resource, an application resource, an access policy or role, an identity policy or role, or a machine image.

15. The system of claim 11, further comprising a configuration service implemented by a third one or more electronic devices, the configuration service including instructions that upon execution cause the configuration service to monitor for code changes, networking changes, policy changes, and governance requirement rule changes, and provide the indication of the change to the intent-based governance service.

16. The system of claim 11, wherein the governance requirement rules are audit type or preventative type.

17. The computer-implemented method of claim 1, wherein the one or more of the governance requirement rules are mapped to one or more compliance, security, or business requirements.

18. The computer-implemented method of claim 1, wherein a type of the resource is a compute resource, a data/storage resource, a network-related resource, an application resource, an access policy or role, an identity policy or role, or a machine image.

19. The computer-implemented method of claim 1, further comprising, for a violation of the one or more of the governance requirements rules, tracking information about an actor that made the update.

20. The computer-implemented method of claim 1, wherein the indication of an update of a resource in a provider network is provided by a configuration service that monitors for code changes, networking changes, policy changes, and governance requirement rule changes.

\* \* \* \* \*